US012776671B2

(12) United States Patent
Dominik et al.

(10) Patent No.: US 12,776,671 B2
(45) Date of Patent: Oct. 27, 2026

(54) COIL MODULE WITH COIL DISCS HAVING ANNULAR COLLING CHANNEL, CERAMIC DELIMITATION FORM SUBSTANTIALLY ANNULAR CERAMIC DISC PROCIDED IN THE RECESS

(71) Applicant: Vaionic Technologies GmbH, Berlin (DE)

(72) Inventors: Yannick Dominik, Berlin (DE); Jörg Berthelmann, Berlin (DE); Georg Franz, Berlin (DE)

(73) Assignee: Vaionic Technologies GmbH, Berlin (DE)

( * ) Notice: Subject to any disclaimer, the term of this patent is extended or adjusted under 35 U.S.C. 154(b) by 346 days.

(21) Appl. No.: 18/557,679

(22) PCT Filed: Apr. 27, 2022

(86) PCT No.: PCT/EP2022/061234
§ 371 (c)(1),
(2) Date: Oct. 27, 2023

(87) PCT Pub. No.: WO2022/229272
PCT Pub. Date: Nov. 3, 2022

(65) Prior Publication Data

US 2024/0322616 A1 Sep. 26, 2024

(30) Foreign Application Priority Data

Apr. 27, 2021 (EP) .................................... 21170784

(51) Int. Cl.
*H02K 1/04* (2006.01)
*H02K 3/47* (2006.01)
(Continued)

(52) U.S. Cl.
CPC ................ *H02K 1/04* (2013.01); *H02K 3/47* (2013.01); *H02K 7/003* (2013.01); *H02K 7/006* (2013.01);
(Continued)

(58) Field of Classification Search
CPC ........ H02K 3/26; H02K 2203/03; H02K 3/28; H02K 3/46; H02K 3/12; H02K 3/47;
(Continued)

(56) References Cited

U.S. PATENT DOCUMENTS 405,858 A * 6/1889 Tesla ...................... H02K 23/04 310/159
2,970,238 A * 1/1961 Swiggett .................. H02K 3/26 336/200
(Continued)

FOREIGN PATENT DOCUMENTS

CA 2262732 A1 2/1998
CN 204559345 U 8/2015
(Continued)

OTHER PUBLICATIONS

International Search Report (including English translation) and Written Opinion for International Application No. PCT/EP2022/061234, dated Sep. 2, 2022.
(Continued)

*Primary Examiner* — Maged M Almawri
(74) *Attorney, Agent, or Firm* — Westman, Champlin & Koehler, P.A.

(57) ABSTRACT

A coil module for an electric machine, comprising a first coil disc with a first coil carrier made of an electrically insulating material, at least one winding embedded in the first coil carrier and made of an electrically conductive material, and a first ceramic delimitation. The coil module comprises a second coil disc with a second coil carrier made of an
(Continued)

A-A electrically insulating material, at least one winding embedded in the second coil carrier and made of an electrically conductive material, and a second ceramic delimitation. The first and second coil discs are configured and attached to each other such that a substantially annular cooling channel for a coolant is formed between the first and second coil discs. The first and second ceramic delimitations each form at least partially an inner wall of the substantially annular cooling channel.

14 Claims, 13 Drawing Sheets

(51) Int. Cl.
*H02K 7/00* (2006.01)
*H02K 7/14* (2006.01)
*H02K 9/19* (2006.01)
*H02K 21/24* (2006.01)

(52) U.S. Cl.
CPC ................. *H02K 7/14* (2013.01); *H02K 9/19* (2013.01); *H02K 21/24* (2013.01); *H02K 2213/03* (2013.01)

(58) Field of Classification Search
CPC ...... H02K 3/521; H02K 1/182; H02K 1/2793; H02K 1/12; H02K 1/2773; H02K 1/32; H02K 21/24; H02K 2201/03; H02K 9/19; H02K 9/22; H02K 9/12; H02K 16/00; H02K 35/02; H02K 2211/03; B60L 58/21; B60L 2240/421; Y02T 10/641; Y02T 10/645; Y02T 10/7005; Y02T 10/7061; Y02T 10/72; Y02T 10/7275; Y02T 10/725; Y02B 10/30
USPC .. 310/6, 49.22, 49.23, 49.32, DIG. 6, 12.21, 310/12.22, 12.23, 12.01–12.33, 15, 25, 310/28, 198
See application file for complete search history.

(56) References Cited

U.S. PATENT DOCUMENTS 3,223,868 A * 12/1965 Henry-Baudot ......... H02K 3/26 310/268
3,223,870 A * 12/1965 Henry-Baudot ......... H02K 3/26 310/268
3,227,903 A * 1/1966 Henry-Baudot ......... H02K 3/26 310/268
3,450,919 A * 6/1969 Henry-Baudot ....... H02K 23/54 310/268
3,944,857 A * 3/1976 Faulhaber ................ H02K 3/26 310/266
4,115,915 A * 9/1978 Godfrey ................ H02K 3/505 310/71
4,187,453 A * 2/1980 Rough ............... H02K 41/0356 310/46
4,340,833 A * 7/1982 Sudo ....................... H02K 3/26 310/268
4,645,961 A * 2/1987 Malsky .................. H02K 37/14 310/216.115
4,658,162 A * 4/1987 Koyama ................ H02K 29/08 318/135
4,677,332 A * 6/1987 Heyraud .................. H02K 3/26 310/DIG. 6
4,794,293 A * 12/1988 Fujisaki ............... H02K 41/031 310/68 R
4,933,584 A * 6/1990 Harms ..................... H02K 1/16 310/156.47
5,789,841 A * 8/1998 Wang ....................... H02K 3/28 310/201
6,033,764 A * 3/2000 Balents ............... C04B 41/0072 428/209
6,998,751 B2 * 2/2006 Lopatinsky ........... F04D 25/066 310/179
7,156,611 B2 * 1/2007 Oosawa ................ F04D 19/007 415/199.5
7,291,956 B2 * 11/2007 Itoh .......................... H02K 3/26 310/71
7,514,833 B2 * 4/2009 Hsu ........................ H02K 21/24 310/156.36
7,607,220 B2 * 10/2009 Reed ........................ H02K 5/06 29/469
8,148,870 B2 * 4/2012 Iki ...................... H02K 15/0407 310/254.1
8,212,445 B2 * 7/2012 Ritchey .................... H02K 1/08 310/112
8,360,735 B2 * 1/2013 Hanaoka ............... F04D 19/007 310/67 R
8,558,425 B2 * 10/2013 Stahlhut ................... H02K 3/26 310/268
8,736,133 B1 * 5/2014 Smith .................... H02K 21/24 310/208
8,941,275 B2 * 1/2015 Genda .................... H02K 5/225 310/71
9,800,111 B2 * 10/2017 Palmer ..................... H02K 3/47
9,859,763 B2 * 1/2018 Shaw ..................... H02K 1/182
10,038,349 B2 * 7/2018 Long ........................ H02K 1/02
10,135,318 B2 * 11/2018 Bickers ................ H02K 7/1876
11,283,319 B2 * 3/2022 Park .................... H01F 27/2804
2001/0045787 A1 * 11/2001 Huth ........................ H02K 3/28 310/180
2003/0020353 A1 * 1/2003 Lopatinsky ......... F04D 25/0653 310/208
2006/0055265 A1 * 3/2006 Zalusky ................. H02K 21/24 310/40 MM
2006/0131978 A1 * 6/2006 Hirzel .................... H02K 21/24 310/168
2006/0202584 A1 * 9/2006 Jore ..................... H02K 1/2795 310/179
2007/0274821 A1 * 11/2007 Yoshida ............. H05K 7/20172 415/68
2007/0296369 A1 * 12/2007 Yeh ......................... H01F 5/003 336/200
2008/0049476 A1 * 2/2008 Azuma ................. B60L 15/007 361/699
2008/0100166 A1 * 5/2008 Stahlhut ................... H02K 1/20 310/156.32
2008/0100174 A1 * 5/2008 Stahlhut ................... H02K 1/20 310/156.32
2010/0001610 A1 * 1/2010 Iki ...................... H02K 15/0407 29/598
2010/0007223 A1 * 1/2010 Denne ...................... H02K 3/26 310/179
2010/0090553 A1 * 4/2010 Ritchey .................... H02K 3/28 310/156.37
2010/0148611 A1 * 6/2010 Wang ....................... H02K 1/14 310/216.006
2011/0037354 A1 * 2/2011 Yan ...................... H02K 11/225 310/68 B
2011/0133596 A1 * 6/2011 Asano .................. H02K 1/2795 310/156.43
2011/0273048 A1 * 11/2011 Jore ......................... H02K 3/47 310/156.37
2011/0285224 A1 * 11/2011 Iki ............................ H02K 3/47 310/64
2012/0080971 A1 * 4/2012 Tanimoto ............... H02K 23/54 310/154.45
2012/0080974 A1 * 4/2012 Tanimoto ................. H02K 3/26 310/208
2012/0126927 A1 * 5/2012 Iwaya ..................... H01F 5/003 336/200
2012/0133474 A1 * 5/2012 Iwaya ..................... H01F 5/003 336/200

(56) References Cited

U.S. PATENT DOCUMENTS

| | | | | |
|---|---|---|---|---|
| 2012/0181886 | A1* | 7/2012 | Osada | H02K 11/05 310/71 |
| 2012/0328945 | A1* | 12/2012 | Hirose | B60L 3/0046 429/219 |
| 2013/0049500 | A1* | 2/2013 | Shan | H02K 3/26 310/71 |
| 2013/0076192 | A1* | 3/2013 | Tanimoto | H02K 3/26 310/208 |
| 2015/0015102 | A1* | 1/2015 | Wong | H02K 16/02 29/598 |
| 2015/0146322 | A1* | 5/2015 | Bi | G11B 19/2009 360/99.08 |
| 2016/0218577 | A1* | 7/2016 | Chen | H02K 3/26 |
| 2016/0329796 | A1* | 11/2016 | Hano | H02K 15/02 |
| 2016/0336824 | A1* | 11/2016 | Duan | H02K 21/24 |
| 2017/0098973 | A1* | 4/2017 | Shaw | H02K 9/223 |
| 2017/0317558 | A1* | 11/2017 | Steg | H02K 15/03 |
| 2018/0131302 | A1* | 5/2018 | Frampton | H02P 9/04 |
| 2019/0115795 | A1* | 4/2019 | Sakuma | H02K 3/16 |
| 2020/0220406 | A1* | 7/2020 | Schuler | H02K 1/182 |
| 2020/0227991 | A1* | 7/2020 | Boettcher | H02K 3/28 |

FOREIGN PATENT DOCUMENTS

| | | | |
|---|---|---|---|
| DE | 10 2017 204 072 | A1 | 9/2018 |
| EP | 4084288 | B1 | 6/2023 |
| GB | 2485185 | A | 5/2012 |
| JP | 2000511399 | A | 8/2000 |
| JP | 2008061357 | A | 3/2008 |
| JP | 2009183072 | A | 8/2009 |
| JP | 2015228780 | A | 12/2015 |

OTHER PUBLICATIONS

English translation of Written Opinion for International Application No. PCT/EP2022/061234, dated Nov. 2, 2023.

Copy and Translation of Japanese Office Action for corresponding Japanese Application No. 2023-566535, dated May 12, 2026, 5 pages.

Copy and Translation of Chinese Office Action for corresponding Chinese Application No. 2022800458281, dated Jun. 26, 2026, 14 pages.

* cited by examiner

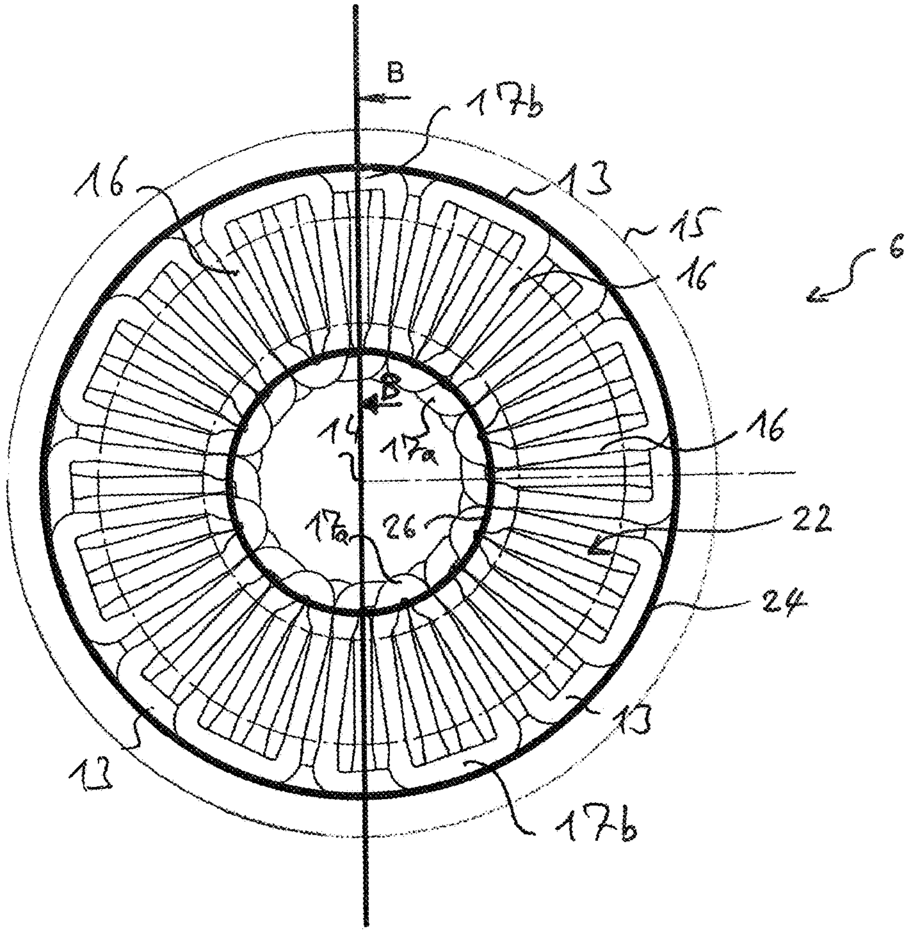
Fig. 7
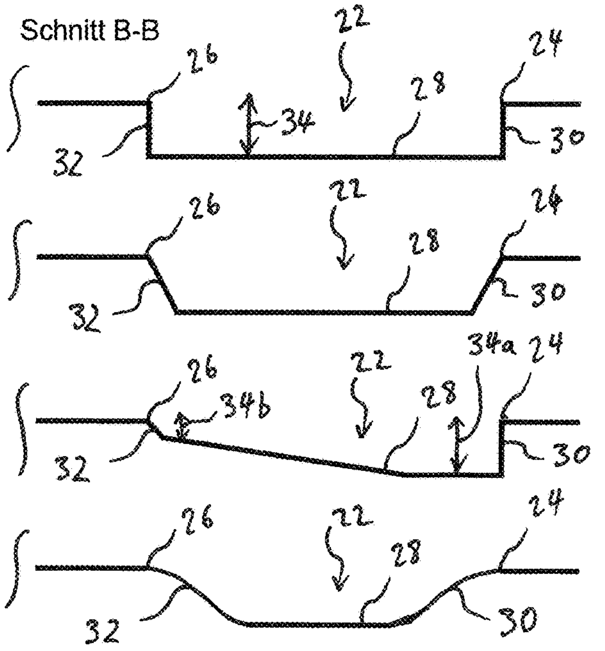
Fig. 8A
Fig. 8B
Fig. 8C
Fig. 8D

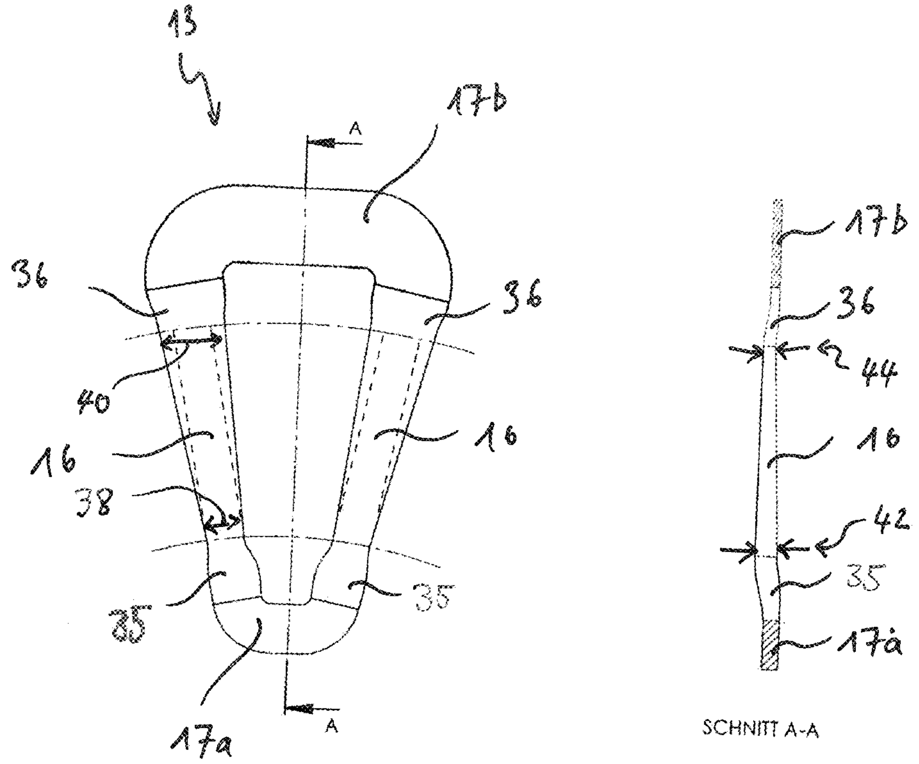
Fig. 9A
Fig. 9B
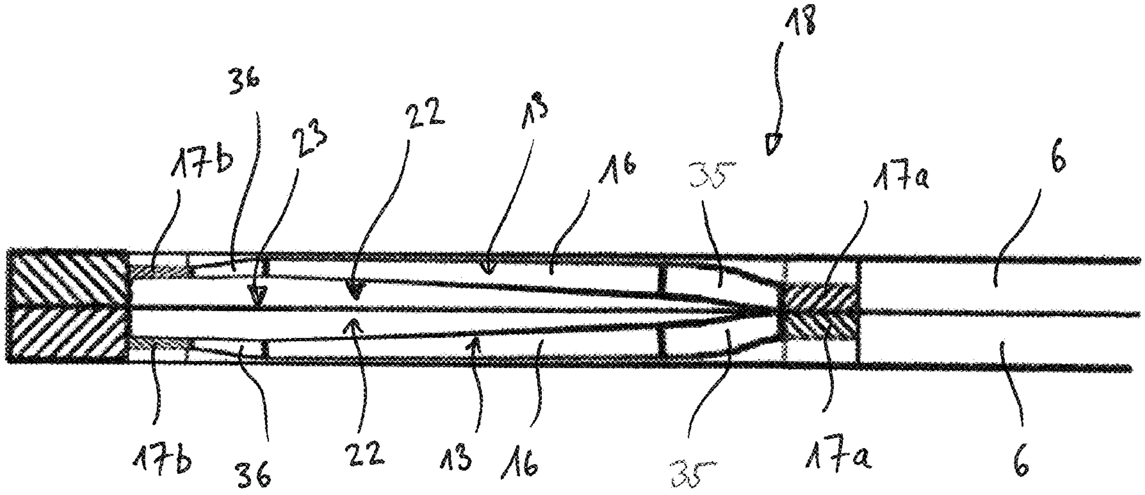
Fig. 10

COIL MODULE WITH COIL DISCS HAVING ANNULAR COLLING CHANNEL, CERAMIC DELIMITATION FORM SUBSTANTIALLY ANNULAR CERAMIC DISC PROCIDED IN THE RECESS

CROSS REFERENCE TO RELATED APPLICATION(S)

This application is a Section 371 National Stage Application of International Application No. PCT/EP2022/061234, filed on Apr. 27, 2022, entitled "Coil module for electric machine", which published as WIPO Publication No. 2022/229272 A1, on Nov. 3, 2022, not in English, which claims priority to European Patent Application No. 21170784.9, filed on Apr. 27, 2021, the contents of which are incorporated herein by reference in their entireties.

BACKGROUND

The present invention relates to a coil module for an electric machine, an electric machine, a vehicle and/or a machine tool.

Electrical machines of various designs are known from the prior art. Document DE 10 2017 204 072 A1 describes a type of winding in meander form for an electric motor in which a high density of electrically conductive material is ensured in the area of a magnetic field generated by permanent magnets. However, the flat wire used is a disadvantage of such setups due to its electromagnetic characteristics, which lead to inefficiency. In addition, a multiphase design is difficult.

SUMMARY

For this reason, the problem underlying the present invention is to propose a coil module for an electrical machine with which these disadvantages can be overcome and a compact design with reduced space requirements can be realized. A further problem underlying the invention is to provide a reliable, effective, space- and/or weight-saving cooling of the electrical machine and/or to increase the service life of the electrical machine.

In the context of the invention, an electrical machine is understood to refer to a device that converts electrical energy into mechanical work or vice versa. In particular, the term "electric machine" may be understood to mean an electric power machine or an electromotor or an electric motor or an electrogenerator or an electric generator.

One, more or all of these problems are solved according to the invention by a coil module, an electrical machine and/or a vehicle or machine tool as described in the following.

A coil module for an electrical machine comprises at least one coil discs. Each coil disc in turn comprises a coil carrier made of an electrically insulating material and a plurality of individual windings made of an electrically conductive material, typically in wire form. The windings are embedded, for example molded, in the coil carrier. The windings are arranged circumferentially around a center of the at least one coil disc on the at least one coil disc. Each of the windings has two active regions extending radially from the center and two passive regions extending tangentially at its radially outer and inner edges. In plan view of the at least one coil disc, the active regions of different windings do not overlap each other, but each passive region of one of the windings partially overlaps the corresponding passive regions of the two immediately adjacent windings, respectively. In cross-section, a thickness of the respective winding in axial direction is greater in the active regions than in the passive regions of the respective winding.

Although this document refers to a plurality of individual windings, several individual electrical windings, e.g., individual windings of the same phase, can be interconnected.

The active regions may be understood to be the regions of the windings that are suitable to contribute to the torque of the electric machine and/or are located in the magnetic field of at least one adjacent magnet module of the electric machine. Accordingly, the passive regions of the windings are not suitable to contribute to the torque of the electric machine and/or are not located in the magnetic field of an adjacent magnet module of the electric machine.

In the context of the present specification, the term "thickness of the respective winding in the axial direction" or "thickness in the axial direction" of the winding is to be understood as the thickness of the winding measured in the axial direction. Similarly, the term "width in the tangential or radial direction" of the winding is to be understood as the width of the winding measured in the tangential or radial direction. That is, "in the axial direction", "in the tangential direction" and "in the radial direction" and comparable specifications indicate the direction along which the respective value (e.g., thickness, width) is measured.

Due to the partial overlap in the passive regions, an amount of electrically conductive material, preferably copper, in the passive regions is typically twice that in the active regions. In order to prevent thickening of the coil disc and a coil module formed of at least one coil disc in the axial direction, the thickness in the axial direction in cross-section is greater in the active regions than in the passive regions, so that a compact structure is ensured. In this context, an electrically insulating material is to be understood to be a material with an electrical conductivity of less than 10-8 S/m at a temperature of 25° C. In this context, an electrically conductive material is to be understood to be any material whose electrical conductivity is greater than 106 S/m at a temperature of 25° C. In the present specification, in accordance with common conventions, the radial direction is understood to be the direction from the center in a straight line to the edge, and the tangential direction is understood to be a direction at right angles to the radial direction. In the context of the present specification, the passive regions can be understood as those regions of the windings which do not extend radially and which connect the two active regions of the respective individual winding. However, the passive regions do not have to extend exactly tangentially. For example, the passive regions can also preferably have short radially extending regions which are adjacent to the active regions and in which, for example, a cross-section change takes place. Due to the fact that the cross-section of the circumferentially arranged windings between active regions and passive regions changes, an axial distance of the air gap between magnetic disks can be varied, thus allowing an increase in the relative copper filling ratio. In addition, the reduced thickness in the passive regions makes it easier to accommodate a three-phase arrangement of windings. In the context of the present specification, a top view is to be understood as a view along a normal vector of the at least one coil disc, while a side view is correspondingly understood as a position angled 90° with respect to the top view. Here, the normal vector is to be understood as starting from the area in which length and width of the at least one coil disc are greater than a thickness of the at least one coil disc. In the electric machine, the normal vector is thus parallel to the axis of rotation. The windings, also referred to as coils, are preferably in the form of coreless or iron-core-less windings. In the context of the present specification, the term "coil carrier" is to be understood in particular as a carrier for windings or coils, which typically connects the windings mechanically and preferably consists of an epoxy resin or other temperature-resistant plastic. In the context of the present specification, the term "coil disc" is to be understood as a corresponding ring fixed by the coil carrier with the coils or windings, while the term "coil module" is to designate a complete built-in unit with at least one coil disc, but typically two or more coil discs.

For example, the plurality of individual windings may be molded into the material of the coil carrier, preferably epoxy resin, to form the coil disc.

A ratio of the thickness of the respective winding in the passive regions to the thickness in the active regions may be less than 1. Preferably, the ratio is greater than or equal to 0.3 and less than 1. For outer passive regions, it is particularly preferable that the ratio is exactly 0.5 in order to take advantage of the larger installation space and to produce a uniform relative thickness with the active region equal to 1 when considering the coil disc.

Typically, a transition from an active region to a passive region changes the shape of the cross-sectional area of the respective winding. Preferably, an area of the cross-sectional region remains the same and a fill factor becomes maximum, which can be done, for example, by pressing, but the changed shape allows more material to be flown through by the magnetic field lines, making the drive more efficient. The changed shape means that the installation space available for the electrically conductive material can be used in the electrical machine while the magnet spacing remains the same, thus increasing performance and efficiency accordingly.

It may be provided that all active regions of different windings, typically all windings, are arranged in and/or intersect a single plane in side view.

This plane may be orthogonal to the axial direction of the coil disc or the electric machine. Furthermore, it should be taken into account that the active regions, e.g., in the fanned-out embodiment, may have a varying thickness, so that their upper and/or lower sides may not have to be parallel to the plane. Preferably, the active regions are configured to intersect the plane. This may exclude a single or may exclude a few active regions in which, for example, the web described herein is configured.

That is, the active regions of the various windings may all be located at the same height in side view in the direction along the normal vector of the coil disc so that, for example, no active area protrudes with respect to the other active regions. This may exclude a single active region or may exclude a few active regions in which, for example, the web described herein is configured.

By arranging them in a single plane, it is achieved that all active regions are equally located in the magnetic field of a magnet module. Alternatively, it is preferred that almost all, preferably all but one, of the active regions of the various windings are all arranged at the same height in side view in the direction along the normal vector of the coil disc, so that, for example, only a small number, preferably one, active region protrudes with respect to the other active regions. For example, the web described herein may be arranged in this region.

Preferably, the thickness in the axial direction of the active regions of the respective windings decreases in the radial outward direction. Furthermore, the width in the tangential direction of the active regions of the respective windings increases in the radial outward direction.

In other words, the active regions are fanned outwards.

This fanning out of the active areas makes it possible to use more conductive material in the respective windings with the same thickness in the axial direction of the coil disc. This in turn leads to a more powerful electric machine and/or higher degree of efficiency of the electric machine.

However, the fanning out has not to be present throughout the active regions of the windings. For example, the active regions adjacent to the passive regions may have respective transitions that are excluded from this fanning out.

Preferably, the cross-sectional area of the active regions remains constant along the radial direction.

Typically, the windings are formed from a fine strand of several wires electrically insulated from one another, the wires electrically insulated from one another having a wire diameter less than or equal to 0.1 mm. By providing several strands with an electrically insulating coating, both sufficient flexibility of the winding formed from the wire can be ensured during production and a sufficiently high electrical conductivity can be achieved.

A number of windings preferably corresponds to an integer multiple of 3, so that the windings enable three-phase operation. Thus, a total of three strings of different phases are formed from the windings. In a particularly preferred manner, all active regions of the windings of all phases are located in a single plane when viewed from the side, while the passive regions of the different phases are distributed over two planes. Typically, the passive regions of two phases are each in one plane and the passive regions of the third phase undergo an additional plane change. The two planes are typically different from each other or offset, but parallel to each other.

It can be provided that all windings are of identical design, i.e., in particular have identical dimensions and shapes. Alternatively, it can also be provided to use at least one winding that differs in shape or thickness from the other windings.

The coil disc may be configured such that an inner passive region and an outer passive region of one of the windings differ in thickness in the axial direction. In this case, the inner passive region is arranged at a smaller distance from the center of the coil disc and the coil module than the outer passive region. Typically, the thickness of the outer passive region of one of the windings is selected so that the ratio of the thickness of this region to the thickness of the active regions is less than or equal to 0.5. For the inner passive region, it can be provided that the ratio of the thickness of said inner passive region to the thickness of the active regions is less than 1. In this way, the cooling surface can be further extended from the active regions to the outer passive regions.

The invention further relates to an electrical machine having a bearing arrangement and a shaft guided in the bearing arrangement, wherein at least one magnet module comprising a plurality of permanent magnets and at least one coil module disclosed within the scope of the present specification are concentrically arranged along the shaft.

The electrical machine such as an electromotor or electric motor or electrogenerator or electric generator has a bearing arrangement and a shaft guided in the bearing arrangement. At least one magnet module with a plurality of permanent magnets and at least one coil module having the previously described properties are arranged concentrically along the shaft, wherein the magnet module is attached to the shaft and the coil module is connected to a housing. Due to the high packing density of the windings, a particularly advantageous efficiency and power density is achieved during operation of the electric machine.

The at least one coil module can be covered with a foil made of an electrically insulating material at least on its side facing the magnet module in order to prevent liquid from passing through and to allow cooling channels to be formed. Instead of an adhesive connection, the foil can also be applied by another connection such as a welded connection as a substance-to-substance connection or a force-fit connection, for example by a screwed-on ring.

In order to efficiently cool the electrical machine and, in particular, the active regions, the at least one coil module can have at least two interconnected coil discs and a cooling channel formed by a cavity between the two coil discs. Alternatively or additionally, the cooling channel may also be formed and bounded by the coil disc or coil module and the foil.

The invention further relates to a vehicle or a machine tool or a tool having an electric machine disclosed within the scope of the present specification.

One or more or all the problems underlying the present invention are solved by the invention of the coil module, the electric machine and/or the vehicle and/or the machine tool disclosed in the following.

Since the coil module described below includes several features that are also disclosed in connection with the coil module described above, technical effects, advantages and explanations described above also apply to corresponding features described below. In particular, it should be noted that the coil module described below may preferably comprise any of the features described above in connection with the coil module.

The coil module comprises a first coil disc with at least one winding made of an electrically conductive material and a second coil disc with at least one winding made of an electrically conductive material. The first coil disc and/or the second coil disc comprises/comprise a substantially annular recess. The first coil disc and the second coil disc are further attached to each other such that a substantially annular cooling channel for a coolant is formed between the first coil disc and the second coil disc by the annular recesses/recess.

The coil module, the first coil disc, the second coil disc, and the windings of the first and second coil discs may be configured as disclosed above.

A substantially annular recess may be understood to mean a recess extending around substantially the entire circumference of the coil disc. The term "substantially" means that the recess includes, for example, one (or more) webs described in more detail below that interrupt(s) the substantially annular recess. The substantially annular recess may extend around a center of the coil disc and may not be at the center of the coil disc. The center of the coil disc is understood to be the point on the coil disc through which the axis of rotation of the shaft or electric machine passes.

The radially outer and/or the radially inner edge of the substantially annular recess may be circular in plan view (i.e., a view orthogonal to the longitudinal and width directions) of the coil disc. In this case, the radially outer and radially inner edges of the recess each denote the transition from the substantially planar surface of the coil disc to the substantially annular recess. However, the shape from the outer and/or inner edge may also deviate from an exact circular shape. For example, the outer and/or inner edge may have a wavy shape. Furthermore, the outer and/or inner edge may also have a polygonal shape.

The recess may have a rectangular cross-section with two opposing lateral surfaces and a bottom surface. Alternatively, the recess may have a trapezoidal cross-section in which the distance between the opposing lateral surfaces decreases toward the bottom surface. Furthermore, the recess may also have a circular arc-shaped or curved cross-section.

In other words, the annular recess may be understood to be a substantially annular depression in the coil disc. The coil disc may have a smaller thickness in the region of the substantially annular recess than in regions outside the annular recess.

The coil disc is preferably manufactured by casting the at least one winding into the electrically insulating material, e.g., epoxy resin. For this purpose, the windings can be placed in a mold, which is then filled with the electrically insulating material. Subsequently, the substantially annular recess can be produced in a pressing process. For example, by means of a substantially annular mold or a punch.

The mold in which the at least one winding is inserted may have projections which keep the gaps between the active regions of the windings free, so that the coil disc has air gaps between the active regions in a substantially annular region in which the active regions of the windings are located. The coil disc with these gaps may be particularly suitable for air cooling of the electric machine, although another form of cooling, for example by means of a coolant (e.g., water-glycol mixture), is also preferred.

In the case of the fanned-out active regions described herein, these projections can preferably be dispensed within the mold so that the distances between the active regions can be very small and no gap remains between the active regions after molding.

However, the essentially annular recess can also be produced by other processes. For example, the mold itself, into which the electrically insulating material is embedded, can define the recess so that no subsequent pressing process is required. The substantially annular recess can further be produced, for example, by milling.

Such a substantially annular recess may be provided in one of the first and/or second coil discs. Preferably, a substantially annular recess is provided in each of the first and second coil discs.

As already mentioned, in the context of the present specification, a disk is to be understood as a body whose length and width or diameter are or is significantly larger than its thickness, e.g., by a factor of 10. The sides of the disk are to be understood as those sides of the body which are parallel to the plane spanned by the length and width, i.e., orthogonal to the axial direction of the electrical machine. The substantially annular recess is provided in one of the sides of the coil disc. However, the coil disc may also have a substantially annular recess on each of the two sides.

The first and second coil discs may be attached to each other such that one of the two sides of the first coil disc abuts one of the two sides of the second coil disc, not excluding that a sealing layer is disposed therebetween. For example, the first coil disc and the second coil disc may be bonded together, and the adhesive may simultaneously seal, for example, the cooling channel from the environment.

In the following, the sides of the first and second coil discs that abut the other coil disc are each called the inner side. Correspondingly, the sides of the first and second coil discs that face outwards and do not abut the other coil disc are called outer sides. It may therefore be understood that the substantially annular recess is provided on the inner side of the first coil disc and/or the inner side of the second coil disc.

If the first and second coil discs each comprise a recess, the recesses of the first and second coil discs preferably have identical shapes and are preferably arranged so that they are exactly opposite and/or overlap each other. However, it is also possible that the recess of the first coil disc has a different shape than the recess of the second coil disc and/or that they are offset from each other when the coil module is assembled.

By the substantially annular cooling channel may be meant a space bounded by the first and second coil discs, which is bounded on the one hand by the wall of the recess in the first or second coil disc and on the other hand by the inner side of the second coil disc. Preferably, the substantially annular cooling channel is bounded by two recesses provided in the first coil disc and the second coil disc. However, the substantially annular cooling channel has not to be completely confined. That is, the substantially annular cooling channel may, for example, include an inlet opening and/or an outlet opening by means of which coolant may enter and/or be discharged from the cooling channel.

This cooling channel offers the advantage that a coolant can be brought very close to the windings, so that the electrical machine can be cooled very effectively. At the same time, this cooling structure does not require any additional components to conduct the coolant, so this cooling structure saves space and weight. In addition, this cooling structure is also very robust and not prone to failure.

The coolant is preferably a water-based coolant, more preferably a water-glycol mixture. However, transformer oil can also be used as a coolant. However, the coil module described herein can also be air-cooled.

Preferably, the first coil disc and/or the second coil disc comprises/comprise an inlet opening in the area of the recess in order to guide coolant into the substantially annular cooling channel. Alternatively or additionally, the first coil disc and/or the second coil disc comprises/comprise an outlet opening in the area of the recess to direct coolant from the substantially annular cooling channel to the outside.

For example, the inlet opening and/or outlet opening may be provided in the radially outer side surface of the recess. Preferably, the inlet opening is provided in the side surface of the recess of the first coil disc and the outlet opening is provided in the side surface of the second recess, or vice versa. An inlet channel may extend from the inlet opening in the first coil disc, and an outlet channel may extend from the outlet opening in the second coil disc. The inlet channel and the outlet channel may each extend radially outwards from the inlet and outlet openings, respectively. The inlet channel may be configured as a recess in the first coil disc, and the outlet channel may be configured as a recess in the second coil disc. At the end of the inlet channel opposite the inlet opening, an inlet hole and/or an inlet through hole may be provided in the first and second coil discs to direct the coolant into the inlet channel. At the end of the outlet channel opposite the outlet opening, an outlet hole and/or an outlet through-hole may be provided in the first and second coil discs to direct the coolant out of the outlet channel.

The inlet channel and/or the outlet channel preferably extend in an outer passive region of a winding which does not cover or only partially covers the outer passive regions of the immediately adjacent windings. In this way, the inlet and/or outlet channel is arranged in a region where the thickness of the windings is as small as possible. This allows a space-saving arrangement.

Alternatively, the inlet and outlet openings and the inlet and outlet channels may be provided in only one of the two coil discs or in both coil discs.

If the electrical machine comprises multiple coil modules connected to each other via a coil spacer, the coil spacer may also comprise inlet and outlet holes. In the assembled state, the inlet holes of the various coil modules and the coil spacers disposed therebetween overlap. Similarly, when assembled, the outlet holes of the various coil modules and the coil spacers disposed therebetween overlap. In other words, all of the inlet and outlet holes may be aligned on the same line.

For example, in the coil disc or coil spacer located at one end of the electric machine, as seen in the axial direction, the inlet and outlet holes can be omitted. In the coil disc or coil spacer located at the other end of the electrical machine, the coolant can be fed into the individual coil modules through the inlet and outlet holes. In this way, the different coil modules can be connected in parallel with respect to coolant flow.

A first connecting line between the inlet opening and the center of the coil disc and a second connecting line between the outlet opening and the center of the coil disc may, in a plan view of the coil disc, enclose an angle that is preferably smaller than 30°, more preferably smaller than 20°, even more preferably smaller than 10°. In particular, it is preferred to arrange the openings as close to each other as possible so that the corresponding angle is as small as possible. In this way, it can be ensured that the coolant flows as completely as possible around the center of the coil disc to ensure cooling of all windings.

Preferably, the first coil disc and/or the second coil disc comprises a web in the recess between the inlet opening and the outlet opening configured in such a way that the substantially annular cooling channel between the inlet opening and the outlet opening has a partition. It should be understood that the web is arranged between the shortest connection of the inlet opening and the outlet opening in the recess to force the coolant to flow around almost the entire circumference of the coil disc.

The web can be understood to be an interruption in the recess. In other words, the web may be understood to extend from the radially inner edge of the recess to the radially outer edge of the recess. For example, the web may extend radially from the inner edge of the recess to the outer edge of the recess. Alternatively, the web may form an angle to the radial direction. In this case, the web may have an upper surface that lies above the bottom surface of the recess, preferably in the same plane as the rest of the inner side of the coil disc. In this case, the web is preferably configured to be as narrow as possible so that it still provides an effective blockage for the coolant.

Preferably, the first connecting line between the inlet opening and the center of the coil disc and the second connecting line between the outlet opening and the center of the coil disc also enclose an angle smaller than 30°. Due to the web between the inlet and outlet opening, the coolant cannot take the "short path" between the inlet and outlet openings and is forced to flow around the remaining, much larger arc section of the cooling channel.

Said web forms a barrier for the coolant in the cooling channel. Thus, the web ensures that the coolant flows through all relevant regions of the first and second coil discs and thus cools all relevant regions of the first and second coil discs.

Preferably, the first and second coil discs each comprise a recess and a web. In the assembled state of the coil module, the web of the first coil disc and the web of the second coil disc lie on top of each other, and it is not excluded that an adhesive and/or sealing layer is arranged therebetween, wherein the adhesive can at the same time represent the seal.

Preferably, the first coil disc and the second coil disc each comprise: at least one coil carrier made of an electrically insulating material and a plurality of individual windings made of an electrically conductive material, which are arranged circumferentially around a center of the at least one coil disc on the at least one coil disc. Each of the windings comprises two active regions extending radially from the center and two passive regions extending tangentially at its radially outer and inner edges. Further, in plan view of the coil disc, the active regions of different windings do not overlap each other, but each passive region of one of the windings partially overlaps the corresponding passive regions of the two immediately adjacent windings, respectively. Furthermore, the respective windings in the active regions have a greater thickness in cross-section in the axial direction than in the passive regions.

Further technical effects, advantages and/or explanations of these features are already disclosed elsewhere in the present specification and also apply to the features described herein.

Preferably, the recesses/recess are/is arranged at least in the region of the radially extending active regions, and preferably also in the region of the radially outer passive regions.

Since the passive regions of one of the windings partially overlap the corresponding passive regions of the immediately adjacent windings and the active regions of the different windings do not overlap each other, space for the recess can be provided in the active regions of the first and/or second coil disc. As this space is used for cooling, the provision of the cooling channel by means of the recess/recesses does not lead to increased space consumption. At the same time, this type of winding as described above offers the advantage that much conductive material can be used in a small space.

However, the recesses/recess can also be provided at least partially in the passive regions, preferably in the radially outer passive regions. For example, the radially outer passive regions may have a larger width in the radial direction than the radially inner passive regions, so that it is possible to form the radially outer passive regions with a smaller thickness in the axial direction. It is also possible that not all of the passive regions of the different windings cover the passive regions of the immediately adjacent windings. Thus, it is for example possible to provide space for the recess also in the in the passive regions.

Preferably, the thickness in the axial direction of the active regions of the respective winding of the first and/or second coil disc decreases in the radial outward direction. Furthermore, the width in tangential direction of the active regions of the respective winding of the first and/or second coil disc increases in radial outward direction.

This structure is also called "fanning out" of the active regions.

Here, the thickness in the axial direction does not have to decrease outwards along the entire length of the active regions, and the width in the tangential direction does not have to increase outwards along the entire length of the active regions. Preferably, however, the active regions are fanned out along at least 70%, preferably at least 90%, of their length.

Further technical effects, advantages and/or explanations of these features are already disclosed elsewhere in the present specification and also apply to the features described herein.

Another advantage of the fanning-out is that the distance or gap between an active region of a winding and the active regions of the immediately adjacent windings can be reduced.

A resulting advantage is that when the recess is located in the active areas of the winding or windings, the bottom surface of the recess is sealed by the coil disc itself. This means that there is no gap between the active regions of the winding or windings that would require additional sealing. The coil disc is thus not only self-supporting but also self-sealing.

In this way, for example, the foil described above can be dispensed with, so that the coil module as a whole has a smaller thickness in the axial direction. In this way, the magnet module in the electrical machine can be brought closer to the winding or windings, which in turn increases the performance and/or efficiency of the electrical machine.

Furthermore, this implies that fewer process steps are required to manufacture the coil disc, coil modules and/or the electrical machine. Furthermore, the tools for forming the coil disc can also be simplified, since no gaps need to be kept free between the active regions of the windings. On the whole, in this way, the manufacturing costs for the electrical machine can be reduced.

Preferably, the distance between an active region of a winding and the active regions of the immediately adjacent windings is a few micrometers.

Preferably, a depth in the axial direction of the recess increases outwards in the radial direction.

The depth in the axial direction of the recess is to be understood as the depth of the recess measured in the axial direction, e.g., the difference between the lowest point (e.g., the bottom surface) of the recess and a plane defined by the inner side of the coil disc.

The feature that the depth in the axial direction of the recess increases radially outwards can be understood to mean that an inner radial substantially annular area of the recess has a smaller depth than a substantially annular region of the recess lying further outwards with respect thereto.

The depth can increase continuously (i.e., steadily) or stepwise (i.e., discontinuously) from the inside to the outside. The depth can also increase linearly or non-linearly from the inside to the outside.

This geometry of the recess is also called "V-Cooling" geometry.

Preferably, a ratio of the thickness of the respective winding in the passive regions to the thickness in the active regions is less than 1.

Technical effects, advantages and/or explanations of these features are already disclosed elsewhere in the present specification and also apply to the features described herein.

Preferably, the ratio of the thickness of the respective winding in the passive regions to the thickness in the active regions is greater than or equal to 0.3 and less than 1.

Technical effects, advantages and/or explanations of these features are already disclosed elsewhere in the present specification and also apply to the features described herein.

Preferably, the summed thickness in the axial direction of two immediately adjacent windings in the region of overlapping passive regions is greater than the thickness in the axial direction of each of the two immediately adjacent windings in the active regions. For example, the summed thickness in the axial direction of two immediately adjacent windings in the region of overlapping inner passive regions and in the region of overlapping outer passive regions is greater than the thickness in the axial direction of each of the two immediately adjacent windings in the active regions.

Alternatively, the summed thickness in the axial direction of two immediately adjacent windings in the region of the overlapping inner passive regions may be greater than the thickness in the axial direction of each of the two immediately adjacent windings in the active regions. Additionally, the summed thickness in the axial direction of two immediately adjacent windings in the region of overlapping outer passive regions may be less than the thickness in the axial direction of each of the two immediately adjacent windings in the active regions.

Due to the fluent transitions of the thicknesses, individual short areas of the windings may have other thicknesses that differ from the above thicknesses.

This may apply to all or substantially all of the immediately adjacent windings. That is, one active region or a few active regions may be located in the region of the web described herein and thus have a greater thickness than the other active regions.

The summed thickness in the axial direction of two immediately adjacent windings in the area of the overlapping passive regions is to be understood as the sum of the respective thickness in the axial direction of the respective passive regions of the respective windings, the thickness of the respective passive regions being measured in an area in which the passive regions of the immediately adjacent windings overlap.

This can apply to the radially inner and radially outer passive regions. Alternatively, in the radially inner passive regions only, the summed thickness in the axial direction of the two immediately adjacent windings may be greater than the thickness in the axial direction of each of the two immediately adjacent windings in the active regions.

In this way, the active regions and, optionally, the outer passive regions preferably occupy less space overall in the axial direction than the passive regions. As a result, the coil discs have space for the recess in the area of the active regions and, optionally, the outer passive regions.

Preferably, a ratio of the summed thickness in the axial direction of two immediately adjacent windings in the overlapping passive region to the maximum thickness in the axial direction of each of the two immediately adjacent windings in the active regions is greater than 1.

This may apply to all immediately adjacent windings.

Preferably, the shape of the cross-sectional area of the respective winding changes at a transition from an active region to a passive region.

Technical effects, advantages and/or explanations of these features are already disclosed elsewhere in the present specification and also apply to the features described herein.

Preferably, all active regions of different windings are arranged in a single plane in side view.

Technical effects, advantages and/or explanations of these features are already disclosed elsewhere in the present specification and also apply to the features described herein.

Preferably the windings are formed from a fine strand of several wires electrically insulated from each other and comprising a wire diameter less than or equal to 0.1 mm.

Technical effects, advantages and/or explanations of these features are already disclosed elsewhere in the present specification and also apply to the features described herein.

Preferably, a number of the windings corresponds to an integer multiple of 3, so that the windings enable three-phase operation.

Technical effects, advantages and/or explanations of these features are already disclosed elsewhere in the present specification and also apply to the features described herein.

Preferably, an inner passive region and an outer passive region of one of the windings differ in thickness in the axial direction.

Technical effects, advantages and/or explanations of these features are already disclosed elsewhere in the present specification and also apply to the features described herein.

Preferably, the thickness of the outer passive region of one of the windings is selected so that a ratio of the thickness of this region to the thickness of the active regions is less than or equal to 0.5.

Technical effects, advantages and/or explanations of these features are already disclosed elsewhere in the present specification and also apply to the features described herein.

The invention further relates to an electrical machine having a bearing arrangement and a shaft guided in the bearing arrangement, wherein at least one magnet module comprising a plurality of permanent magnets and at least one coil module disclosed within the scope of the present specification are concentrically arranged along the shaft.

Preferably, the electric machine has at least one coil module, preferably at least one coil module and a maximum of six coil modules, particularly preferably at least one coil module and a maximum of three coil modules. The electrical machine preferably has one more magnet module than coil modules.

Technical effects, advantages and/or explanations of these features are already disclosed elsewhere in the present specification and also apply to the features described herein.

The invention further relates to a vehicle or machine tool comprising an electric machine as disclosed in the present specification.

Technical effects, advantages and/or explanations of these features are already disclosed elsewhere in the present specification and also apply to the features described herein.

One, more or all of the problems underlying the invention are solved by the invention by the coil module disclosed below, the electric machine disclosed below and/or the vehicle or machine tool disclosed below.

Since the coil module described below includes several features that are also disclosed in connection with the coil module described above, technical effects, advantages and explanations described above also apply to corresponding features described below. In particular, it should be noted that the coil module described below may preferably comprise any of the features described above in connection with the coil module.

The coil module for an electrical machine according to the invention comprises a first coil disc with a first coil carrier made of an electrically insulating material, at least one winding made of an electrically conductive material embedded in the first coil carrier, and a first ceramic delimitation. Further, the coil module comprises a second coil disc with a second coil carrier made of an electrically insulating material, at least one winding embedded in the second coil carrier made of an electrically conductive material, and a second ceramic delimitation. The first coil disc and the second coil disc are configured and attached to each other such that a substantially annular cooling channel for a coolant is formed between the first coil disc and the second coil disc. The first ceramic delimitation and the second ceramic delimitation each at least partially form an inner wall of the substantially annular cooling channel. The cooling channel preferably has an axial extent of between 1 mm and 2 mm.

The coil module, the first coil disc, the second coil disc, and the windings of the first and second coil discs may be configured as disclosed above.

The first coil disc and the second coil disc, in particular the first coil carrier and the second coil carrier, are configured such that when assembled and/or abutting each other, they form a substantially annular cooling channel therebetween. In other words, the cooling channel may be a cavity between the first coil disc and the second coil disc that is adapted and/or configured to carry a coolant, thereby effectively removing heat from the first coil disc and/or second coil disc.

For example, the first and/or second coil carriers comprise/comprises a substantially annular recess that forms the cooling channel when the first and second coil discs are in the assembled state. For example, the first and second coil carriers may each have a raised and/or thicker radially inner portion that abut one another when the first and second coil discs are in the assembled state. The radially outer portions of the first and second coil carriers may be spaced apart from each other when the first and second coil discs are in the assembled state, thereby forming the substantially annular cooling channel. Said cooling channel may be delimited outwardly, as viewed in the radial direction, by a further delimitation, for example the radially outer ceramic delimitation described herein and/or the coil carrier ring.

The first ceramic delimitation may be understood to be a structure of ceramic material of the first coil disc that at least partially forms and/or lines the inner wall of the substantially annular cooling channel. The second ceramic delimitation may be understood to be a structure of ceramic material of the second coil disc that forms at least partially and/or lines the inner wall of the substantially annular cooling channel. In other words, the first ceramic delimitation may delimit the interior of the substantially annular cooling channel from the first coil carrier and the second ceramic delimitation may delimit the interior of the substantially annular cooling channel from the second coil carrier.

The ceramic delimitations can be provided in various ways. For example, the ceramic delimitations may be provided in the form of discs of ceramic material arranged between the coil discs on the first and second coil carriers, respectively. The ceramic delimitations may also be provided in the form of a ceramic coating on the coil carriers. This can also be combined, i.e., to provide part of the ceramic delimitation in the form of ceramic discs and part in the form of a ceramic coating on the coil carriers.

The first and second ceramic delimitations may be two separate structures that are bonded, e.g., glued, together when the first coil disc and the second coil disc are assembled to form the inner wall of the substantially annular cooling channel. The first and second ceramic delimitations may also be formed in one piece and/or integrally with each other.

Such a ceramic delimitation is advantageous in several respects. On the one hand, the ceramic contained in the ceramic delimitation is vapor-tight or substantially vapor-tight. Thus, the ceramic delimitations do not absorb water and/or prevent water from the cooling channel from accumulating in the insulating material of the coil carriers. Ceramics have high overall media and/or chemical resistance. Furthermore, the ceramic of the ceramic delimitation has a significantly higher thermal conductivity than the material of the coil carriers. For example, the thermal conductivity of ceramic is about 100 times higher than that of plastic. Thus, the ceramic delimitation can provide better heat dissipation through the coolant in the cooling channel. Ceramics are also electrically insulating.

Thus, the first and second ceramic delimitations can prevent the coolant in the cooling channel from contacting the first and second coil carriers and accumulating in the material of the first and second coil carriers. Such accumulation of the coolant can cause the coil carrier material to lose its insulating effect, for example, if the coolant contains water. However, since the coils are under voltage during operation, it must always be ensured that there is sufficient electrical insulation between the windings and the housing. Since the coolant comes into contact with the housing and windings during direct cooling, insulation must be ensured here as well. Thus, by providing the ceramic delimitations, it is possible to use a water-containing coolant while ensuring that the coil carriers retain their insulating effect over a long period of time. Water-containing coolants are advantageous because of the high heat capacity and good thermal conductivity of water. For this reason, it is possible to improve the cooling of the coil disc of the electric machine, and to increase the service life of the electric machine at the same time. At the same time, the dissipation of heat from the coil discs is also improved.

Furthermore, the ceramic delimitation offers the advantage that it can reduce the thickness of the electrically insulating material of the coil carrier, which in turn improves the cooling capacity and efficiency of the electrical machine.

In addition, the ceramic of the ceramic delimitations is a mechanically very strong material. Therefore, the ceramic delimitations can also provide or improve the mechanical strength and/or stability of the coil discs. The mechanical strength of the coil discs can prevent the coil discs from expanding in the axial direction due to the internal pressure of the coolant and the electromagnetic forces acting in the coil module, so that the rotor would possibly drag on the coil module. In this way, the material selection for the coil carriers can be focused on heat conduction and heat resistance, while the mechanical strength of the coil discs can be ensured by the ceramic delimitation.

Preferably, the first and/or second ceramic delimitation comprises/comprise an aluminum-based and/or silicon-based ceramic, preferably a material selected from the group consisting of aluminum oxide, aluminum nitride, silicon carbide and silicon nitride.

In terms of their properties, these ceramic materials are suitable for use as ceramic delimitation. Aluminum oxide, moreover, is widely used and readily available, among other things, and is therefore particularly suitable.

However, other ceramic materials can also be used for ceramic delimitation.

Preferably, the first ceramic delimitation forms the inner wall of the substantially annular cooling channel throughout the radial region of the substantially annular cooling channel; and/or the second ceramic delimitation forms the inner wall of the substantially annular cooling channel throughout the radial region of the substantially annular cooling channel.

In other words, the first and second ceramic delimitations may form the inner wall of the substantially annular cooling channel throughout the radial region of the substantially annular cooling channel. In this manner, the material is protected from the coolant throughout the radial region of the cooling channel.

Preferably, the first ceramic delimitation comprises a first ceramic disc arranged on the first coil carrier. Preferably, the second ceramic delimitation comprises a second ceramic disc arranged on the second coil carrier Such ceramic discs can, for example, be cut or punched out of a planar ceramic raw material.

The ceramic disc can be placed on the coil carrier during manufacture of the coil disc after embedding, e.g., casting, of the windings and glued to the coil carrier. Alternatively, the ceramic disc can be placed in the tool during casting of the windings to produce the coil carrier and cast together with the windings.

This enables a simple and efficient manufacturing process of the coil modules.

Preferably, the first ceramic disc and/or the second ceramic disc comprise/comprises a thickness between 0.1 mm and 1 mm, preferably between 0.2 mm and 0.8 mm, more preferably between 0.35 mm and 0.7 mm.

With such a thickness, on the one hand, the delimitation of the coolant as well as the strength of the coil disc can be ensured, while the additional axial expansion of the coil disc is reduced to a minimum by the ceramic delimitation.

Preferably, the first ceramic disc and the second ceramic disc are part of a ceramic cooling channel formed in one piece and/or integrally.

The ceramic cooling channel can, thus, be a three-dimensional hollow body formed in one piece and/or integrally, comprising the first ceramic disc and the second ceramic disc. In other words, the ceramic cooling channel may have the shape of an annular tube, whereby the cooling channel is formed by the hollow space of the hollow body and/or the annular tube. The ceramic cooling channel may also be divided in multiple segments each of which comprising a disc segment of the first ceramic disc and the second ceramic disc. These segments may each have the form of a curved tube.

Preferably, the first ceramic disc comprises at least two, preferably two, three or four, ceramic disc segments and/or the second ceramic disc comprises at least two, preferably an even number of, more preferably four, ceramic disc segments. These ceramic discs may be arranged adjacent to each other on the respective coil carrier.

Providing the ceramic disc in form of multiple ceramic disc segments may simplify the manufacturing of the ceramic discs, particularly when the ceramic discs have a certain size.

Preferably the ceramic delimitation comprises at least one ceramic seal member arranged on the ceramic disc segment in order to seal a joint between the ceramic disc segments.

In other words, the ceramic disc segments may be arranged on the coil carrier in such a manner that one or more butt joints form between the ceramic disc segments. These butt joints are sealed preferably by arranging a ceramic seal member on the ceramic disc segments in the region of each butt joint. Said ceramic seal member may be strip-shaped. The ceramic seal member may be mounted to the ceramic discs by means of an adhesive. Preferably, a ceramic seal member is arranged at each butt joint between the ceramic disc segments.

By means of the ceramic seal members, it can be ensured that the ceramic sealing is also tight in the region of the butt joints between the ceramic disc segments.

Preferably, the first ceramic delimitation comprises a first ceramic coating applied to the first coil carrier. Preferably, the second ceramic delimitation comprises a second ceramic coating applied to the second coil carrier.

In this way, a very thin ceramic delimitation can be provided. This reduces, among others, the installation space of the coil module, which in turn increases the degree of efficiency of the electrical machine. In addition, a coating can have a high thermal conductivity. Since such a coating can be applied directly, an additional adhesive layer between the coil carrier and the delimitation is not required either, so that the installation space can be further reduced. Consequently, the thermal resistance of the adhesive is also eliminated.

The coating can be applied by means of vapor deposition, preferably physical vapor deposition (PVD). The coating can also be applied by chemical vapor deposition (CVD), electroplating or sol-gel processes.

Preferably, the first ceramic coating and/or the second ceramic coating comprise/comprises a thickness between 1 μm and 100 μm, preferably between 1 μm and 50 μm, more preferably between 1 μm and 30 μm.

Preferably, the first coil carrier and/or the second coil carrier comprise/comprises a substantially annular recess. Further, according to the invention, the first ceramic delimitation and/or the second ceramic delimitation are/is provided in the form of a substantially annular ceramic disc arranged in the substantially annular recess on the first coil carrier and the second coil carrier, respectively.

Technical effects, advantages and/or explanations of these features are already disclosed elsewhere in the present specification and also apply to the features described herein.

The substantially annular recess of the first coil carrier and/or the second coil carrier may be provided, for example, by raising a radially inner region of the first and/or second coil carrier relative to a radially outer region of the first and/or second coil carrier, respectively, and/or by increasing the axial thickness of the coil carrier in the radially inner region relative to the radially outer region. For example, the inner passive regions of the windings disclosed herein may be arranged in the radially inner regions of the coil carriers, whereas the active regions and outer passive regions of the windings are arranged in the radially outer regions of the coil carriers. The substantially annular ceramic disk may have a radially inner recess substantially coincident with the radially inner regions of the coil carriers. The outer diameter of the annular ceramic disk may substantially match the diameter of the coil carriers.

Preferably, the coil module comprises at least one connecting element arranged in the substantially annular cooling channel and adhered to, preferably integrally formed with, both the first ceramic delimitation and the second ceramic delimitation.

In other words, the at least one connecting element can connect the first ceramic delimitation and the second ceramic delimitation to each other. In this way, the strength of the coil discs or coil module provided by the ceramic delimitations can be further improved. At the same time, the connecting elements can increase the cooling surface of the cooling channel and thus improve heat dissipation from the coil discs. Furthermore, the connecting elements can be arranged and/or configured in the cooling channel in such a way that they result in turbulence of the coolant, which in turn can additionally improve heat dissipation.

For example, the connecting elements can be formed integrally and/or in one piece with the ceramic delimitations. However, it is also possible to provide the connecting elements as separate elements which are bonded to the ceramic delimitations, for example.

Preferably, the at least one connecting element comprises an aluminum-based and/or silicon-based ceramic, preferably a material from the group consisting of aluminum oxide, aluminum nitride, silicon carbide and silicon nitride. Preferably, the at least one connecting element is bonded to or integrally formed with the first ceramic delimitation and/or the second ceramic delimitation.

Preferably, the at least one connecting element comprises a strut preferably arranged perpendicular to the first and/or second coil disc. Preferably, the at least one connecting element has a rib extending parallel to the first and/or second coil disc.

Such connecting elements can simultaneously improve the stability of the coil module as well as the cooling performance.

Preferably, the coil module comprises a radially inner ceramic delimitation, wherein the radially inner ceramic delimitation is further preferably collar-shaped and/or ring-shaped and, viewed in the radial direction, is arranged inside adjacent to the first ceramic delimitation and the second ceramic delimitation.

The radially inner ceramic delimitation can prevent the region of the coil carrier adjacent to the cooling channel radially on the inside from coming into contact with and absorbing the coolant.

The radially inner ceramic delimitation can be provided as a separate element that is bonded to the first and/or second ceramic delimitation, for example. Alternatively, the radially inner ceramic delimitation may also be configured as a part, formed integrally and/or in one piece with the first and/or second ceramic delimitation.

Preferably, the coil module comprises a radially outer ceramic delimitation, wherein the radially outer ceramic delimitation is preferably collar-shaped and/or ring-shaped and, viewed in the radial direction, is arranged outside adjacent to the first ceramic delimitation and the second ceramic delimitation.

The radially outer ceramic delimitation can prevent the cooling channel from being delimited to the outside when viewed in the radial direction. Furthermore, the radially outer ceramic delimitation can prevent the coolant from escaping to the outside in the radial direction to then come into contact with and/or being absorbed by adjacent regions of the coil carrier.

The radially outer ceramic delimitation can be provided as a separate element that is bonded to the first and/or second ceramic delimitation, for example. Alternatively, the radially outer ceramic delimitation may also be configured as a part, formed integrally and/or in one piece with the first and/or second ceramic delimitation.

Preferably, the first coil disc and/or second coil disc comprises an inlet opening for conducting coolant into the substantially annular cooling channel. Preferably, the first coil disc and/or the second coil disc comprise/comprises an outlet opening for conducting coolant from the substantially annular cooling channel to the outside.

The inlet opening and/or outlet opening may be provided in an area of the first and/or second coil disc which, viewed in the radial direction, is arranged outside the coil carrier. For example, each coil disc may have a coil carrier ring arranged radially outside and/or surrounding the coil carrier. The inlet and/or outlet opening(s) may be arranged in the coil carrier ring. The inlet and/or outlet opening may be provided in the form of a bore aligned in the axial direction. The inlet opening allows the coolant to enter the cooling channel, flow through the cooling channel, and then exit through the outlet opening. Preferably, the inlet opening and the outlet opening are offset by 180° with respect to the axial axis of the coil module.

This form of guiding the coolant has proven to be advantageous both in terms of the cooling function and the manufacture of the coil module.

Preferably, a plurality of individual windings made of an electrically conductive material are embedded in the first coil carrier, each of which is embedded in the first coil carrier circumferentially around a center of the first coil carrier. Further embedded in the second coil carrier are a plurality of individual windings of an electrically conductive material, each of which is embedded in the second coil carrier circumferentially around a center of the second coil carrier. Each of the windings comprises two active regions extending radially from the center and two passive regions extending tangentially at its radially outer and inner edges.

Preferably, in plan view of the coil disc, the active regions of different windings do not cover each other, but each passive region of one of the windings partially covers the corresponding passive regions of the two directly adjacent windings, wherein in the axial direction the respective winding, in cross-section, has a greater thickness in the active regions than in the passive regions.

Technical effects, advantages and/or explanations of these features are already disclosed elsewhere in this specification and also apply to the features described herein.

Preferably, adjacent active regions of the plurality of individual windings of the first coil disc and the second coil disc are spaced apart from each other in the tangential direction such that a gap is arranged between the adjacent active regions, wherein the first ceramic delimitation and the second ceramic delimitation each comprise projections which extend into the gaps arranged between the adjacent active regions.

In other words, the adjacent active regions of the plurality of individual windings may be spaced apart such that the first coil carrier and the second coil carrier, respectively, each comprise a gap between adjacent active regions of the plurality of individual windings. Projections of the first and second ceramic delimitations may extend in the axial direction into these gaps.

The gaps and projections can preferably be in the form of circular sectors or "pieces of a pie".

The projections can be part of the ceramic delimitation or inserted separately in the gap and optionally be bonded to the ceramic delimitation. The projections can comprise or consist of the same ceramic material as the ceramic delimitation or another material.

On the one hand, these projections can further increase the stability of the coil discs and/or additionally reinforce the coil disc. As a result, the load due to the internal pressure of the coolant in the cooling channel can be better absorbed. Furthermore, a form fit which can absorb a torque can be provided between the projections of the ceramic delimitation and the gaps of the coil carrier. Due to electromagnetic interactions, for example, a torque is generated between the rotor and the windings of the stator or coil module. On the one hand, this torque causes rotation of the rotor and must be dissipated at the stator. By providing the cake pieces, the torque can be transferred from the coil carrier to the ceramic delimitation due to the form fit between the coil carrier and the ceramic delimitation. The ceramic delimitation can then conduct the torque to the housing of the coil module and the electrical machine, respectively. In this manner, deformation of the windings, in particular of the active regions of the windings, can be prevented. The projections can also improve heat dissipation from the windings. In this way, cooling performance can be significantly increased.

Preferably, the cooling channel is arranged at least in the area of the radially extending active regions and preferably also in the region of the radially outer passive regions.

In other words, the cooling channel can extend in a radial area of the first and second coil discs in which at least the active regions of the windings are arranged. Since a large part of the heat is generated in the active regions of the windings, heat dissipation can be improved in this manner.

Preferably, the cooling channel extends at least in the entire radial area of the first and second coil discs in which the active regions of the windings are arranged in their entirety.

Preferably, the thickness in the axial direction of the active regions of the respective winding of the first and/or second coil disc decreases in the radial outward direction. Preferably, the width in tangential direction of the active regions of the respective winding of the first and/or second coil disc increases in the radial outward direction.

Technical effects, advantages and/or explanations of these features are already disclosed elsewhere in the present specification and also apply to the features described herein.

Preferably, a depth in the axial direction of the recess increases in the region of the active regions in the radial outward direction.

Technical effects, advantages and/or explanations of these features are already disclosed elsewhere in the present specification and also apply to the features described herein.

Preferably, a ratio of the thickness of the respective winding in the passive regions to the thickness in the active regions is less than 1. Preferably, the ratio of the thickness of the respective winding in the passive regions to the thickness in the active regions is greater than or equal to 0.3 and less than 1.

Technical effects, advantages and/or explanations of these features are already disclosed elsewhere in the present specification and also apply to the features described herein.

Preferably, the shape of the cross-section surface of the respective winding changes during a transition from an active region to a passive region.

Technical effects, advantages and/or explanations of these features are already disclosed elsewhere in the present specification and also apply to the features described herein.

Preferably, all active regions of different windings of the first coil disc are arranged in a single plane in side view. Preferably, all active regions of different windings of the second coil disc are arranged in a single plane in side view.

Technical effects, advantages and/or explanations of these features are already disclosed elsewhere in the present specification and also apply to the features described herein.

Preferably, the windings are formed from a fine strand of several wires electrically insulated from each other which comprise a wire diameter less than or equal to 0.1 mm.

Technical effects, advantages and/or explanations of these features are already disclosed elsewhere in the present specification and also apply to the features described herein.

Preferably, a number of the windings of the first coil disc and/or the second coil disc each corresponds to an integer multiple of 3, so that the windings enable three-phase operation.

Technical effects, advantages and/or explanations of these features are already disclosed elsewhere in the present specification and also apply to the features described herein.

Preferably, an inner passive region and an outer passive region of one of the windings differ in thickness in the axial direction. Preferably, the thickness of the outer passive region of one of the windings is selected such that a ratio of the thickness of this region to the thickness of the active regions is less than or equal to 0.5.

Technical effects, advantages and/or explanations of these features are already disclosed elsewhere in the present specification and also apply to the features described herein.

The invention further relates to an electric machine comprising a bearing arrangement and a shaft guided in the bearing arrangement, wherein at least one magnet module comprising a plurality of permanent magnets and at least one coil module disclosed within the scope of the present specification are concentrically arranged along the shaft.

Technical effects, advantages and/or explanations of these features are already disclosed elsewhere in the present specification and also apply to the features described herein.

The invention further relates to a vehicle or machine tool comprising an electric machine disclosed within the scope of the present specification.

Further preferred embodiments of the invention are disclosed by the following numbered items:

1. A coil module (18) for an electric machine, comprising:
   at least one coil disc (6)
   with at least one coil carrier (15) made of an electrically insulating material and having a plurality of individual windings (13) made of an electrically conductive material, the windings being arranged circumferentially around a center (14) of the at least one coil carrier (6) on the at least one coil carrier (6), wherein
   each of the windings (13) comprises two active regions (16) extending radially from the center (14) and two passive regions (17*a*, 17*b*) extending tangentially at its radially outer and inner edges, and
   in a plan view of the coil disc (6), the active regions (16) of different windings (13) do not cover each other, but each passive region (17*a*, 17*b*) of one of the windings (13) partially covers the corresponding passive regions (17*a*, 17*b*) of the two directly adjacent windings (13), characterized in that
   in the axial direction the respective winding (13), in cross-section, has a greater thickness in the active regions (16) than in the passive regions (17*a*, 17*b*).
2. The coil module (18) according to item 1, characterized in that the ratio of the thickness of the respective winding (13) in the passive region (17*a*, 17*b*) to the thickness in the active region (16) is less than 1.
3 The coil module (18) according to item 1 or item 2; characterized in that the ratio of the thickness of the respective winding (13) in the passive region (17*a*, 17*b*) to the thickness in the active region (16) is greater than or equal to 0.3 and less than 1.
4. The coil module according to any one of the preceding items, characterized in that the shape of the cross-section of the respective winding (13) changes at the transition from an active region (16) to a passive region (17*a*, 17*b*).
5. The coil module (18) according to any one of the preceding items, characterized in that, in a side view, all active regions (16) of different windings (13) are all arranged in a single plane.
6. The coil module (18) according to any one of the preceding items, characterized in that the thickness in the axial direction of the active regions (16) of the respective winding (13) decreases in the radial outward direction; and the width in tangential direction of the active regions (16) of the respective winding (13) increases in the radial outward direction.
7. The coil module (18) according to any one of the preceding items, characterized in that the windings are formed of a fine strand of a plurality of wires electrically insulated from each other and having a wire diameter of less than or equal to 0.1 mm.
8. The coil module (18) according to any one of the preceding items, characterized in that a number of the windings (13) corresponds to an integer multiple of 3, so that the windings (13) enable three-phase operation.

9. The coil module (18) according to any one of the preceding items, characterized in that an inner passive region (17*a*) and an outer passive region (17*b*) of one of the windings (13) differ in thickness in the axial direction.
10. The coil module according to item 9, characterized in that the thickness of the outer passive region (17) of one of the windings (13) is selected so that the ratio of the thickness of this region to the thickness of the active regions (16) is less than or equal to 0.5.
11. An electric machine comprising a bearing arrangement (1, 3) and a shaft (2) guided in the bearing arrangement (1, 3), wherein at least one magnet module (4) comprising a plurality of permanent magnets (5) and at least one coil module (18) according to any one of the preceding items are concentrically arranged along the shaft (2).
12. The electric machine according to item 11, characterized in that the at least one coil module (18) is covered with a foil made of an electrically insulating material at least on its side facing the magnet module (4).
13. The electric machine according to item 11 or item 12, characterized in that the at least one coil module (18) comprises at least two interconnected coil discs (6) and a cooling channel formed by a cavity between the two coil discs.
14. A vehicle or machine tool comprising an electric machine according to any one of items 11 to 13.
15. The coil module (18) for an electric machine, particularly according to any one of the preceding items, comprising:
    - a first coil disc (6) with at least one winding (13) made of an electrically conductive material;
    - a second coil disc (6) with at least one winding (13) made of an electrically conductive material;
    - wherein the first coil disc (6) and/or the second coil disc (6) comprise/comprises a substantially annular recess (22);
    - wherein the first coil disc (6) and the second coil disc (6) are attached to each other such that a substantially annular cooling channel (23) for a coolant is formed between the first coil disc (6) and the second coil disc (6) by the substantially annular recesses/recess (22).
16. The coil module (18) according to item 15, wherein the first coil disc (6) and/or the second coil disc (6) comprises/comprise an inlet opening (43) in the area of the recess (22) in order to guide coolant into the substantially annular cooling channel (23); and/or
    - the first coil disc (6) and/or the second coil disc (6) comprises/comprise an outlet opening (45) in the area of the recess (22) in order to direct coolant from the substantially annular cooling channel (23) to the outside.
17. The coil module (18) according to item 16; wherein the first coil disc (6) and/or the second coil disc (6) comprises a web (38*a*, 38*b*) in the recess (22) between the inlet opening (43) and the outlet opening (45) configured in such a way that the substantially annular cooling channel (23) between the inlet opening (43) and the outlet opening (45) has a partition.
18. The coil module (18) according to any one of items 15 to 17, wherein each of the first coil disc (6) and the second coil disc (6) comprises:
    - at least one coil carrier (15) made of an electrically insulating material and
    - a plurality of individual windings (13) made of an electrically conductive material, which are arranged circumferentially around a center (14) of the at least one coil disc (6) on the at least one coil disc (6), wherein
    - each of the windings (13) comprises two active regions (16) extending radially from the center (14) and two passive regions (17*b*) extending tangentially at its radially outer and inner edges and
    - in plan view of the coil disc (6), the active regions (16) of different windings (13) do not overlap each other, but each passive region (17*a*, 17*b*) of one of the windings (13) partially overlaps the corresponding passive regions (17*a*, 17*b*) of the two directly adjacent windings (13), respectively, characterized in that
    - the respective windings (13) in the active regions (16) have a greater thickness in cross-section in the axial direction than in the passive regions (17*a*, 17*b*).
19. The coil module according to item 18, wherein the recesses/recess (22) are/is arranged at least in the region of the radially extending active regions (16), and preferably also in the region of the radially outer passive regions (17*b*).
20. The coil module (18) according to item 19, wherein the thickness in the axial direction of the active regions (16) of the respective windings (13) of the first and/or the second coil disc (6) decreases in the radial outward direction; and
    - wherein the width in the tangential direction of the active regions (16) of the respective windings (13) of the first and/or the second coil disc (6) increases in the radial outward direction.
21. The coil module (18) according to item 20, wherein a depth (34, 34*a*, 34*b*) in the axial direction of the recess (22) in the active regions (16) increases outwards in the radial direction.
22. The coil module (18) according to any one of items 18 to 21, wherein a ratio of the thickness of the respective winding (13) in the passive regions (17*a*, 17*b*) to the thickness in the active regions (16) is less than 1.
23. The coil module (18) according to any one of items 18 to 22; wherein the ratio of the thickness of the respective winding (13) in the passive regions (17*a*, 17*b*) to the thickness in the active regions (16) is greater than or equal to 0.3 and less than 1.
24. The coil module (18) according to any one of items 18 to 23, wherein the shape of the cross-sectional area of the respective winding (13) changes in a transition from an active region (16) to a passive region (17*a*, 17*b*).
25. The coil module (18) according to any one of items 18 to 24, characterized in that, in a side view, the active regions (16) of different windings (13) are all arranged in a single plane.
26. The coil module (18) according to any one of items 18 to 25, characterized in that the windings are formed of a fine strand of a plurality of wires electrically insulated from each other and having a wire diameter of less than or equal to 0.1 mm.
27. The coil module (18) according to any one of items 18 to 26, characterized in that a number of the windings (13) corresponds to an integer multiple of 3, so that the windings (13) enable three-phase operation.
28. The coil module (18) according to any one of items 18 to 27, characterized in that an inner passive region (17*a*) and an outer passive region (17*b*) of one of the windings (13) differ in thickness in the axial direction.

29. The coil module according to item 28, characterized in that the thickness of the outer passive region (17*b*) of one of the windings (13) is selected so that the ratio of the thickness of this region to the thickness of the active regions (16) is less than or equal to 0.5.
30. An electric machine comprising a bearing arrangement (1, 3) and a shaft (2) guided in the bearing arrangement (1, 3), wherein at least one magnet module (4) comprising a plurality of permanent magnets (5) and at least one coil module (18) according to any one of the items 15 to 29 are concentrically arranged along the shaft (2).
31. A vehicle (150) or machine tool (154) comprising an electric machine according to item 30.

Further embodiments of the present invention are disclosed by the following numbered aspects:

1. A coil module (18) for an electric machine, particularly according to any one of the preceding items, comprising:
   a first coil disc (6, 6*a*) with a first coil carrier (15, 15*a*) made of an electrically insulating material, at least one winding (13) embedded in the first coil carrier (15, 15*a*) and made of an electrically conductive material, and a first ceramic delimitation (56, 56*a*);
   a second coil disc (6, 6*b*) with a second coil carrier (15, 15*b*) made of an electrically insulating material, at least one winding (13) embedded in the second coil carrier (15, 15*b*) and made of an electrically conductive material, and a second ceramic delimitation (56, 56*b*);
   wherein the first coil disc (6, 6*a*) and the second coil disc (6, 6*b*) are configured and attached to each other such that a substantially annular cooling channel (23) for a coolant is formed between the first coil disc (6, 6*a*) and the second coil disc (6*b*); and
   wherein the first ceramic delimitation (56, 56*a*) and the second ceramic delimitation (56, 56*b*) each form at least partially an inner wall of the substantially annular cooling channel (23).
2. The coil module (18) according to aspect 1, wherein the first and/or second ceramic delimitation (56, 56*a*, 56*b*) comprise/comprises an aluminum-based and/or silicon-based ceramic, preferably a material selected from the group consisting of aluminum oxide, aluminum nitride, silicon carbide and silicon nitride.
3. The coil module (18) according to any one of the preceding aspects, wherein the first ceramic delimitation (56, 56*a*) forms the inner wall of the substantially annular cooling channel (23) in the entire radial region of the substantially annular cooling channel; and/or wherein the second ceramic delimitation (56, 56*b*) forms the inner wall of the substantially annular cooling channel (23) in the entire radial region of the substantially annular cooling channel.
4. The coil module (18) according to any one of the preceding aspects, wherein the first ceramic delimitation (56, 56*a*) comprises a first ceramic disc arranged on the first coil carrier (15, 15*a*) and/or
   wherein the second ceramic delimitation (56, 56*b*) comprises a second ceramic disc arranged on the second coil carrier (15, 15*b*).
5. The coil module (18) according to aspect 4, wherein the first ceramic disc (56, 56*a*) and/or the second ceramic disc (56, 56*b*) have/has a thickness between 0.1 mm and 1 mm, preferably between 0.2 mm and 0.8 mm, further preferably between 0.35 mm and 0.7 mm.
6. The coil module (18) according to aspect 4 or 5, wherein the first ceramic disc and the second ceramic disc are part of a ceramic cooling channel formed in one piece.
7. The coil module (18) according to any one of aspects 4 to 6, wherein the first ceramic disc (56, 56*a*) comprises at least two, preferably an even number of, more preferably four, ceramic disc segments and/or.
   Wherein the second ceramic disc (56, 56*b*) comprises at least two, preferably an even number of, more preferably four, ceramic disc segments
8. The coil module (18) according to aspect 7, wherein the ceramic delimitation comprises at least one ceramic seal member arranged on the ceramic disc segments in order to seal a joint between the ceramic disc segments.
9. The coil module (18) according to any one of aspects 1 to 3,
   wherein the first ceramic delimitation (56, 56*a*) comprises a ceramic coating applied to the first coil carrier (15, 15*a*); and/or
   the second ceramic delimitation (56, 56*b*) comprises a ceramic coating applied to the second coil carrier (15, 15*b*).
10. The coil module (18) according to aspect 9, wherein the first ceramic coating and/or the second ceramic coating have/has a thickness between 1 μm and 100 μm, preferably between 1 μm and 50 μm, further preferably between 1 μm and 30 μm.
11. The coil module (18) according to any one of the preceding aspects, wherein the first coil carrier (15, 15*a*) and/or the second coil carrier (15, 15*b*) comprise/comprises a substantially annular recess (22); and
   wherein the first ceramic delimitation (56, 56*a*) and/or the second ceramic delimitation (56, 56*b*) are/is provided in form of a substantially annular ceramic disc which is arranged in the substantially annular recess (22) on the first coil carrier and/or second coil carrier.
12. The coil module (18) according to any one of the preceding aspects, further comprising: at least one connecting element (63, 64) which is arranged in the substantially annular cooling channel (23) and connected to, preferably integrally formed with, both the first ceramic delimitation (56, 56*a*) and the second ceramic delimitation (56, 56*b*).
13. The coil module (18) according to aspect 12,
   wherein the at least one connecting element (63, 64) preferably comprises an aluminum-based and/or silicon-based ceramic, preferably a material selected from the group consisting of aluminum oxide, aluminum nitride, silicon carbide and silicon nitride; and/or
   wherein the at least one connecting element (63, 64) is adhered to or integrally formed with the first ceramic delimitation and/or the second ceramic delimitation.
14. The coil module according to aspect 12 or 13,
   wherein the at least on connecting element (63, 64) comprises a strut preferably arranged perpendicularly to the first and/or second coil disc (6, 6*a*, 6*b*); and/or
   wherein the at least one connecting element (63, 64) comprises a rib extending in parallel to the first and/or second coil disc (6, 6*a*, 6*b*).
15. The coil module (18) according to any one of the preceding aspects, further comprising a radially inner ceramic delimitation (57);

wherein the radially inner ceramic delimitation (57) is preferably collar-shaped and/or ring-shaped and, viewed in the radial direction, is arranged inside adjacent to the first ceramic delimitation (56, 56*a*) and the second ceramic delimitation (56, 56*b*).

16. The coil module (18) according to any one of the preceding aspects, further comprising a radially outer ceramic delimitation (58);
 wherein the radially outer ceramic delimitation (58) is preferably collar-shaped and/or ring-shaped and, viewed in the radial direction, is arranged outside adjacent to the first ceramic delimitation (56, 56*a*) and the second ceramic delimitation (56, 56*b*).

17. The coil module (18) according to any one of the preceding aspects, wherein the first coil disc (6, 6*a*) and/or the second coil disc (6, 6*b*) comprises an inlet opening (43, 54) for conducting coolant into the substantially annular cooling channel (23); and/or
 wherein the first coil disc (6, 6*a*) and/or the second coil disc (6, 6*b*) comprises an outlet opening (45, 55) for conducting coolant from the substantially annular cooling channel (23) to the outside.

18. The coil module (18) according to any one of the preceding claims, wherein a plurality of individual windings (13) made of an electrically conductive material are embedded in the first coil carrier (15, 15*a*), each of which is embedded in the first coil carrier (15, 15*a*) circumferentially around a center (14) of the first coil carrier (15, 15*a*),
 wherein a plurality of individual windings (13) of an electrically conductive material are embedded in the second coil carrier (15, 15*b*), each of which is embedded in the second coil carrier (15, 15*b*) circumferentially around a center (14) of the second coil carrier (15, 15*b*), wherein each of the windings (13) comprises two active regions (16) extending radially from the center (14) and two passive regions (17*b*) extending tangentially at its radially outer and inner edges, and
 wherein, in a plan view of the coil disc (6, 6*a*, 6*b*), the active regions (16) of different windings (13) do not cover each other, but each passive region (17*a*, 17*b*) of one of the windings (13) partially covers the corresponding passive regions (17*a*, 17*b*) of the two directly adjacent windings (13), wherein, in the axial direction the respective winding (13), in cross-section, has a greater thickness in the active regions (16) than in the passive regions (17*a*, 17*b*).

19. The coil module (18) according to aspect 18, wherein adjacent active regions (16) of the plurality of individual windings (13) of the first coil disc (6, 6*a*) and the second coil disc (6, 6*b*) are spaced apart from each other in the tangential direction so that a gap is arranged between the adjacent active regions (16), and wherein each of the first ceramic delimitation (56, 56*a*) and the second ceramic delimitation (56, 56*b*) comprises projections (65) which extend into the gaps arranged between the adjacent active regions (16).

20. The coil module (18) according to aspect 18 or 19, wherein the cooling channel (23) is arranged at least in the region of the radially extending active regions (16) and preferably also in the region of the radially outer passive regions (17*b*).

21. The coil module (18) according to aspect 20, wherein the thickness in the axial direction of the active regions (16) of the respective windings (13) of the first and/or the second coil disc (6) decreases in the radial outward direction; and
 wherein the width in the tangential direction of the active regions (16) of the respective windings (13) of the first and/or the second coil disc (6) increases in the radial outward direction.

22. The coil module (18) according to aspect 21, wherein a depth (34, 34*a*, 34*b*) in the axial direction of the recess (22) in the active regions (16) increases in the radial outward direction.

23. The coil module (18) according to any one of aspects 18 to 22, wherein a ratio of the thickness of the respective winding (13) in the passive regions (17*a*, 17*b*) to the thickness in the active regions (16) is less than 1;
 wherein the ratio of the thickness of the respective winding (13) in the passive regions (17*a*, 17*b*) to the thickness in the active regions (16) is preferably greater than or equal to 0.3 and less than 1.

24. The coil module (18) according to any one of aspects 18 to 23, wherein the shape of the cross-sectional area of the respective winding (13) changes in a transition from an active region (16) to a passive region (17*a*, 17*b*).

25. The coil module (18) according to any one of aspects 18 to 24, wherein, in a side view, the active regions (16) of different windings (13) of the first coil disc (15) are all arranged in a single plane; and/or
 wherein, in a side view, the active regions (16) of different windings (13) of the second coil disc (15) are all arranged in a single plane.

26. The coil module (18) according to any one of aspects 18 to 25, wherein the windings are formed of a fine strand of a plurality of wires electrically insulated from each other and having a wire diameter of less than or equal to 0.1 mm.

27. The coil module (18) according to any one of aspects 18 to 26, wherein a number of the windings (13) of the first coil disc (15) and/or the second coil disc (15) each corresponds to an integer multiple of 3, so that the windings (13) enable three-phase operation.

28. The coil module (18) according to any one of aspects 18 to 27, wherein an inner passive region (17*a*) and an outer passive region (17*b*) of one of the windings (13) differ in thickness in the axial direction;
 wherein the thickness of the outer passive region (17*b*) of one of the windings (13) is preferably selected so that the ratio of the thickness of this region to the thickness of the active regions (16) is less than or equal to 0.5.

29. An electric machine comprising a bearing arrangement (1, 3) and a shaft (2) guided in the bearing arrangement (1, 3), wherein at least one magnet module (4) comprising a plurality of permanent magnets (5) and at least one coil module (18) according to any one of the preceding aspects are concentrically arranged along the shaft (2).

30. A vehicle (150) or machine tool (154) comprising an electric machine according to aspect 29.

BRIEF DESCRIPTION OF THE DRAWINGS

Exemplary embodiments of the invention are shown in the drawings and are explained below with reference to the figures discussed below.

Shown is:

FIG. 7A plan view of a coil disc;

FIG. 8A to 8D Sectional views through a coil disc

FIGS. 9A, 9B Plan view and sectional view of a winding;

FIG. 10A sectional view through a coil module;

DETAILED DESCRIPTION OF THE DRAWINGS

Figure 1:
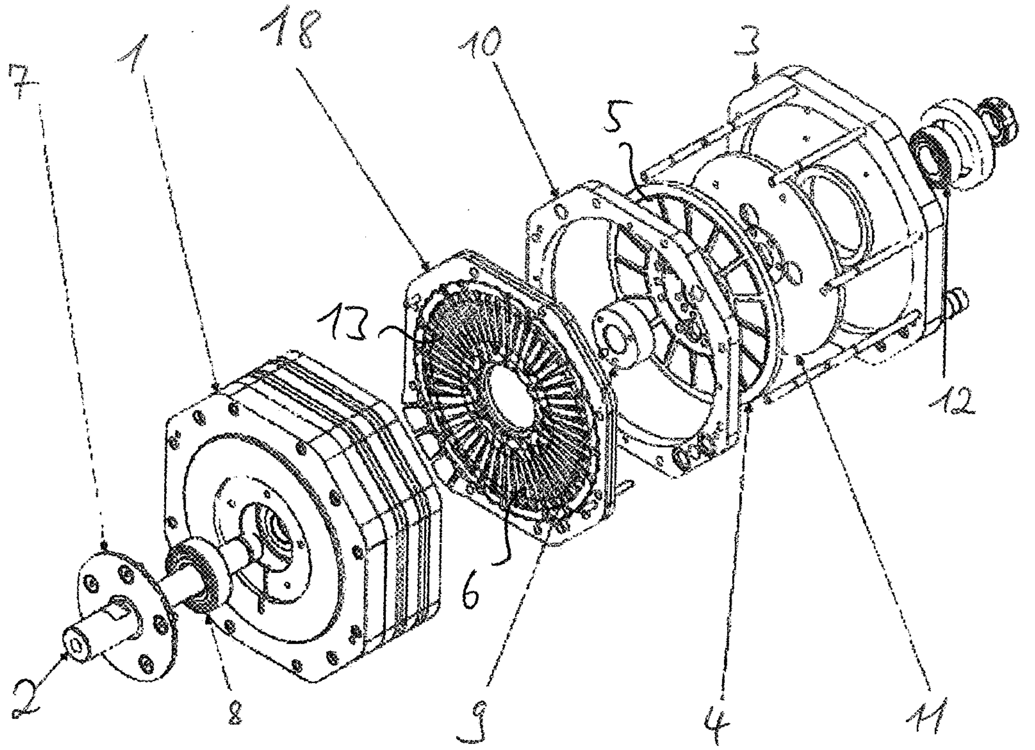
FIG. 1 An exploded view of an electric motor.

FIG. 1 shows an exploded view of an electric motor. A first bearing shield 1 together with a second bearing shield 3 forms a bearing arrangement for a motor shaft 2. The motor shaft 2 is guided centrally in the bearing shields 1 and 3 and is provided with a bearing cap 7 and a fixed bearing 8 in the region of the first bearing shield 1 and with a floating bearing 12 in the region of the second bearing shield 3. In the embodiment shown, the bearing shields 1 and 3, the bearing cap 7 and a coil spacer 10 and a magnetic spacer 9 are formed from polyamide, the motor shaft 2 is configured from stainless steel and the fixed bearing 8 and the floating bearing 12 are configured from steel as deep groove ball bearings.

Between the first bearing shield 1 and the second bearing shield 3, a coil module 18 consisting of two coil discs 6 arranged axially one behind the other and a magnet disc and a magnet module 4, respectively, are visibly arranged, which are kept at a predetermined spatial distance from each other by the coil spacer 10 and the magnet spacer 9. The coil module 18 is disc-shaped, i.e. its length and width are significantly greater than its thickness (which is measured in the axial direction in FIG. 1). The term “significantly greater” should be understood to mean that its thickness is at a maximum 10 percent of its length and its width, respectively. The length and the width are typically equal. In the illustrated embodiment, the coil module 18 serves as a stator that is stacked on the motor shaft 2 and adjacent to two magnetic disks or magnet modules 4 which serve as rotors. The stator is arranged centrally between the two magnetic disks 4. In addition, in the embodiment shown in FIG. 1, an iron return 11 is provided between the magnetic disk 4 and the second bearing shield 3, this iron return 11, however, can also be omitted or designed alternatively in further embodiments.

The magnetic discs 4 are made of a non-magnetizable, preferably electrically non-conductive material such as aluminum, and are mounted on the motor shaft 2, which is mounted in the bearings 8 and 12 of the bearing shields 1 and 3. Also mounted on the motor shaft 2 is the magnetic spacer 9, which creates an air gap between the magnetic discs 4 in which the coil module 18 is arranged. Permanent magnets 5 are arranged radially circumferentially on the magnetic disk 4 in alternating orientation, i.e. always alternating with the north pole and south pole pointing in the direction of the stator, i.e. in the axial direction. A number of the permanent magnets 5 is always even in this case. Preferably, the number of permanent magnets 5 exactly twice the number of windings per phase.

In the embodiment shown in FIG. 1, a single coil module 18 can be made from two coil discs 6, but provision is also made to connect three or more of these coil discs 6 to one another and thus obtain the coil module 18. During operation, a cooling medium can be conducted in a cavity forming between the individual coil discs 6. The simplest but at the same time efficiently operable structure of the motor is formed by a single coil module 18 with a single coil disc 6 and two magnetic discs 4, but it may also be envisaged to provide correspondingly more coil modules 18 and magnetic discs 4, wherein a number of the magnetic discs 4 is preferably greater by one than a number of the coil modules 18. Advantages of a corresponding modular design result from the variable number of installed coil modules 18 and magnetic disks 4, in particular with a corresponding shaft and bearing design. In addition to a combination of the two modules coil module 18 and magnetic disk 4, the variation of the individual modules leads to further flexibility in the motor design. The coil module 18 and the magnetic disk 4 can be adapted independently of each other, e.g. only the permanent magnets 5 may need to be adapted, while the rest of the structure remains unchanged.

Figure 2:
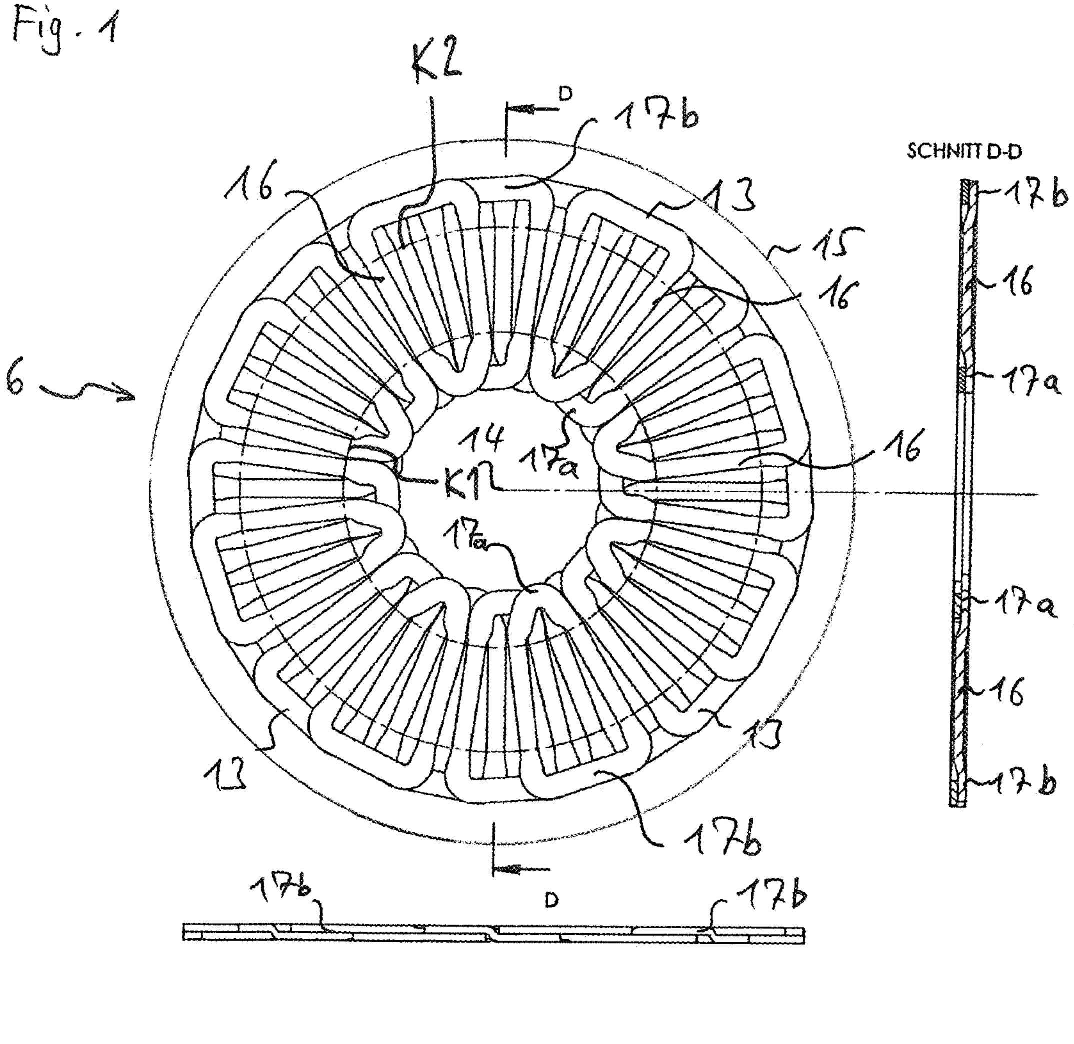
FIG. 2A plan view of a coil disc.

In FIG. 2, a coil carrier 15 forming the coil disc 6 with windings 13 arranged thereon is shown in a plan view, i.e. along a normal direction which is perpendicular to both the length and the width of the coil module 18. Recurring features are indicated by identical references in this Figure as well as in the following Figures. The coil carrier 15 is round in plan view, i.e. the length exactly corresponds in size to the width, and is made of an electrically insulating material. A plurality of individual windings 13 are arranged radially circumferentially on the coil carrier 15 around a center 14 of the coil carrier 15, wherein each of the windings 13 is electrically insulated from immediately adjacent windings 13. At the center 14, the axis of rotation of the electrical machine intersects the coil carrier 15. In the embodiment shown in FIG. 2, these windings 13 are wound in three phases. Each winding consists of several turns of strands. This results in every third winding 13 being designed in the same manner regarding its arrangement in the grouping. These windings 13 are also positioned identically in terms of their depth orientation and arrangement: thus, a first phase is formed by the windings 13 visible as the uppermost layer in FIG. 1, a second phase is formed by the windings 13 half-covered as seen from above, and a third phase is formed by the windings 13 fully covered as seen from above.

Each of the windings 13 comprises two active regions 16 extending radially from the center 14 of the coil disc 6, which contribute to the torque of the motor, and two passive regions 17*a* and 17*b* extending approximately tangentially at its radially outer edge and inner edge, i.e. a radially inner passive region 17*a* and a radially outer passive region 17*b*. The inner passive regions 17*a*, which are thus arranged closer to the center 14 than the outer passive regions 17*b*, are shorter in length than the outer passive regions 17*b*. The active regions 16 of different windings 13 do not overlap each other in plan view, i.e. in a view along the motor shaft 2, each of the inner and outer passive regions 17*a* and 17*b* of one of the windings 13 partially covers the corresponding passive regions 17*a* and 17*b* of the two immediately adjacent windings 13, respectively.

The circles K1 and K2 represent the radially inner and radially outer boundaries of the active regions 16. That means, the active regions 16 extend from the inner circle K1 to the outer circle K2. The regions of the windings that lie outside said circles K1 and K2 are to be assigned to the passive regions 17*a* and 17*b*.

In the embodiment shown in FIG. 2, each of the three phases is made up of individual teeth, i.e. individual windings 13; the individual windings 13 are wound several times, but also only a single turn can be provided. A special feature is that the different phases in the spoke-like active regions 16 lie next to each other in a single plane. In FIG. 2, these active regions 16 are indicated by the two circular lines above the windings 13. Thus, the active regions 16 are also identical in shape and dimensions, while the passive regions 17*a* and 17*b* are different both in shape and dimensions.

The passive regions 17*a* and 17*b* comprise overlaps of two always adjacent teeth, which means that the individual phases must undergo a plane change. Without a cross-section change, the thickness of the coil disc 6 doubles in the axial direction in the region of the passive regions 17*a* and 17*b* when there is a direct overlap. A resulting increase in an axial distance of the permanent magnets 5 can be influenced by a change in cross-section, i.e. a change in the thickness-to-width ratio or height-to-width ratio, of the windings 13. A ratio of the thickness of the respective winding 13 in the active regions 16 to the thickness in the passive regions 17*a* and 17*b* is exactly 2 in the illustrated embodiment. In a simplified manner, it may be assumed that thickness or height of the active regions 16 (which are all identical in terms of their thickness in the embodiment shown) in the axial direction is standardized to 1, whereas the passive regions 17*a* and 17*b* (which are also all identical in terms of their thickness in the embodiment shown) have a thickness of 0.75 which in relation to said standardized thickness is smaller, but in a side view, these thicknesses of the passive regions 17*a* and 17*b* add up to only 1.5 due to their aligning arrangement one behind the other. Such an arrangement is shown, for example, in the sectional view in FIG. 2 on the right-hand side. While the passive regions 17*a* and 17*b*, considered individually, each have a smaller thickness or height than the active regions 16, the passive regions 17 appear thicker in the superimposed arrangement of the windings 13 due to the overlaps, resulting in additional installation space in the central part in which the permanent magnets 5 can be located closer to the active regions 16. The lower part of FIG. 2 schematically shows a course of the outer passive regions 17*b*. It is clear that every third winding 13 undergoes a plane change in its passive region 17*b*. In the illustrated embodiment, a number of windings 13 corresponds to an integer multiple of three, so that the windings 13 enable three-phase operation. Thus, a total of three strings of different phases are formed from the windings 13, wherein all active regions 16 of the windings 13 are present in a single plane in side view, while the passive regions 17*a* and 17*b* are distributed over two planes. Two phases are each in one plane and a third phase undergoes an additional plane change.

For example, two phases may be stacked or juxtaposed in the radial direction instead of in the axial direction by a corresponding cross-section change, resulting in an enlargement of the coil disc 6 in the radial direction. When the height or thickness of the passive regions 17*a* and 17*b* is doubled in the radial direction, doubling of the two phases in the axial direction is compensated for, resulting in one plane for the entire coil disc 6. This thus results in a three-phase wound ironless coil module 18 with adaptable cross-section change of the windings 13 and, thus, adaptable axial height of the coil module 18 for use in ironless axial flux electric motors.

Hence, in the embodiment shown in FIG. 2, eight windings 13 that are arranged in a circle and electrically connected in series form a coil. Corresponding to the three phases of the electric current, three of these coils are combined with the coil carrier 15 in the coil disc 6 and the coil module 18.

In further embodiments, it is also possible to bond two or more coil discs 6 together or otherwise connect them to each other in a material-locking or force-locking manner to obtain the coil module 18. A size of the cavity between the active regions 16 can be adjusted by changing the cross-section of the coil structure formed by the windings 13.

Although not explicitly shown in FIG. 2, the coil carrier 15 is configured such that a cooling channel is formed when two such coil carriers 15 are placed on top of each other. Further, the coil carrier 15 is provided with the ceramic delimitations disclosed within the scope of the present specification.

Figure 3:
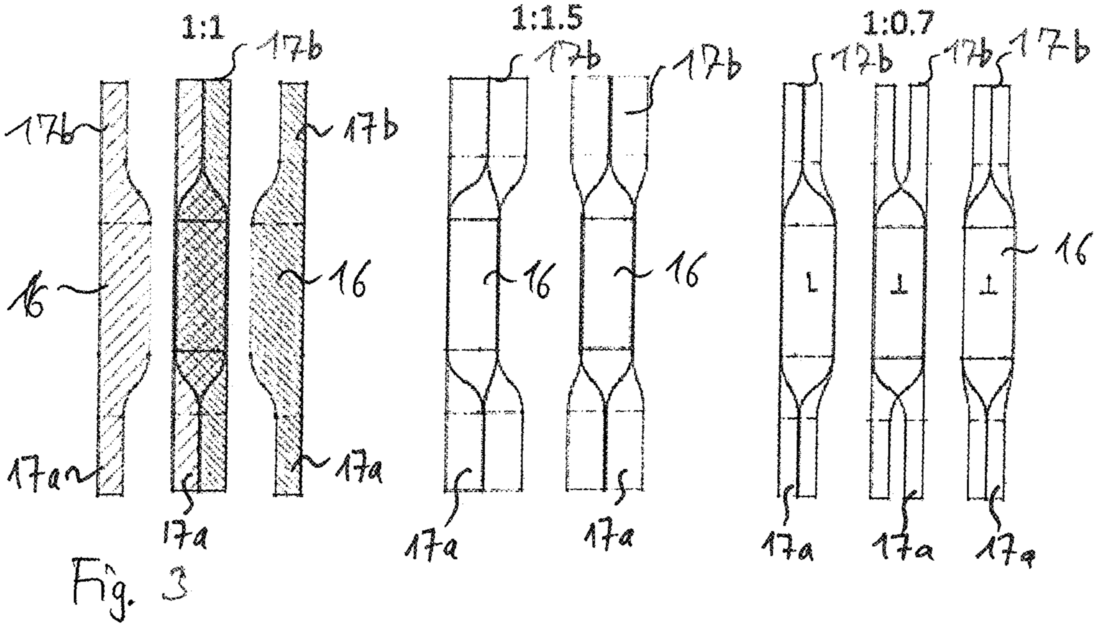
FIG. 3A side view of a coil module.

FIG. 3 shows a schematic side view of corresponding cross-section changes on the coil disc 6. In FIG. 3, a winding 13 is schematically shown on the left under the ratio 1:1, in which the passive regions 17*a* and 17*b* are only half as thick as the active regions 16. In a single coil disc 6, only the passive regions 17*a* and 17*b* always overlap partially (and never completely), but never the active regions 16. The thicker active regions 16 are arranged one behind the other in the same plane in the left illustration of FIG. 3, while the passive regions 17*a* and 17*b* are only half as thick due to the cross-section change, and, due to the different planes, result in an overall ratio between active regions 16 and passive regions 17*a* and 17*b* of 1:1, i.e. the sum of the thicknesses of the passive regions 17*a* and 17*b* is exactly equal to the thickness of the active regions 16 in cross-section.

In the middle drawing in FIG. 3 with the ratio 1:1.5, the coil disc 6 is again shown in cross-section. As a result of the overlap, the passive regions 17 are now just 1.5 times thicker in total in the cross-sectional view than the active regions 16, which require less installation space in side view due to their arrangement one behind the other. The two embodiments shown under 1:1.5 show different plane changes, resulting in one cavity on the right of active region 16 in the first embodiment (left) and two cavities on both sides of active region 16 in the second embodiment (right). The magnets of the magnet arrangement can be inserted into cavities configured in such a manner, thus reducing the axial distance or gap between the active regions 16 and the permanent magnets 5 (even if said distance or gap cannot disappear completely). The available installation space is thus utilized more efficiently. Alternatively, the cavities that form can also be used for cooling.

Finally, a ratio of 1:0.7 is shown on the right side of FIG. 3. The three embodiments shown illustrate a configuration of cavities by corresponding changes of cross-section and plane in the passive regions 17*a* and 17*b*. These cavities can also be used for cooling. In the described embodiments, flexible strands made of copper or aluminum with a diameter of less than 2 mm, namely 1.2 mm in the embodiment shown, are preferably used for the windings 13, which consist of several individual wires electrically insulated from one another with a diameter of less than 0.2 mm, but typically 0.05 mm in the embodiment shown.

A cavity formed between the active regions 16 which are configured as webs of the coil discs 6 forming the coil module 18 can be used for the flow of a cooling medium. In this case, for hydraulic sealing, the coil discs 6 are covered on a side facing the magnetic disc 4 with a fluid-tight film made of an electrically non-conductive material, so that the coil module 18 formed by a plurality of coil discs 6 is sealed off from the outside. The cavities can be rectangular, triangular or trapezoidal and have complex shapes, respectively.

Figure 4:
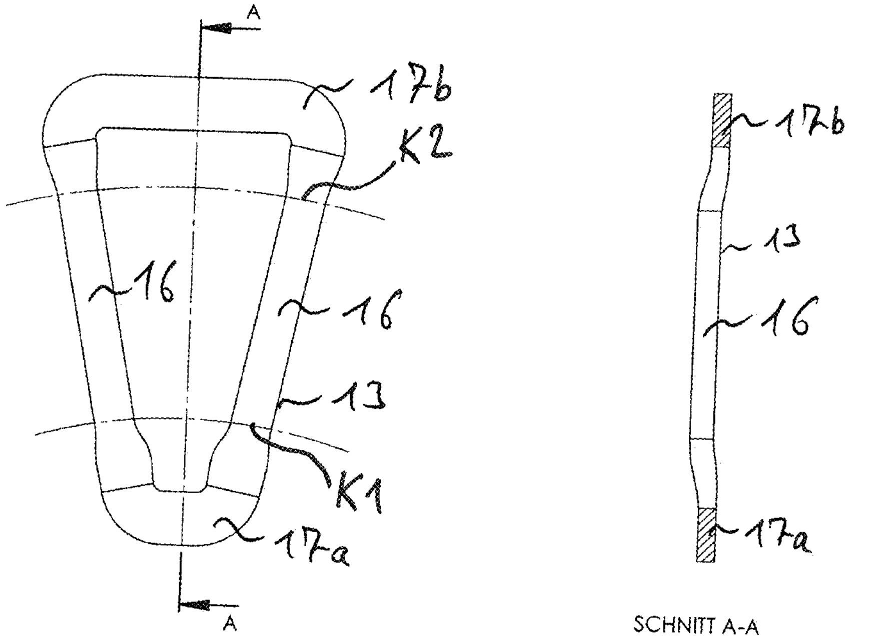
FIG. 4A plan view and sectional view of a winding.

In FIG. 4, a plan view of one of the windings 13 is shown on the left side of the Figure, corresponding to the illustration in FIG. 2. It is clear from the sectional view through the winding 13 shown on the right side of FIG. 4 that the thickness is greater in the active regions 16 than in the passive regions 17*a* and 17*b*.

As in FIG. 2, the circles K1 and K2 represent the extent of the active regions 16.

Figure 5:
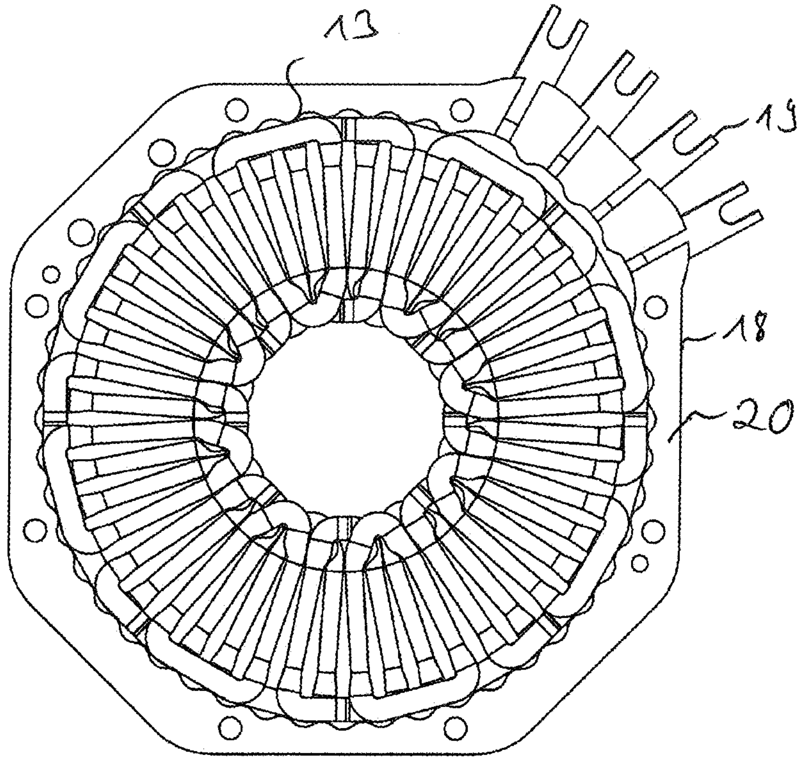
FIG. 5A plan view of the coil module.

FIG. 5 shows a coil module 18 in a plan view corresponding to FIG. 2 in which two coil discs 6 are arranged one behind the other in the axial direction and are each embedded in a coil carrier ring 20 supplementing the coil carrier 15, wherein from the windings 13, electrical contacts 19 are led out of the coil carrier ring 20. In this embodiment, the coil carrier ring 20 is made of a glass fiber epoxy resin fabric.

Figure 6:
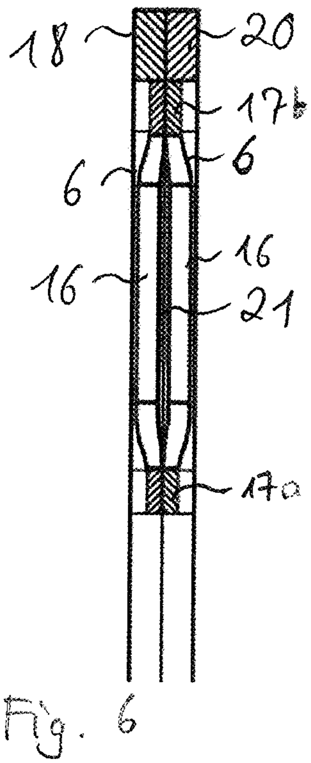
FIG. 6A sectional view of the coil module.

FIG. 6 shows a sectional view of the coil module 18, wherein the two combined coil discs 6 are arranged in such a way that a cavity 21 is formed between the active regions 16 of the two coil discs 6, forming the cooling channel described in the context of the present specification. Since the coil discs are sealed in a fluid-tight manner by means of a foil, a cooling medium can be introduced into this cavity 21.

FIG. 7 shows an inner side of a coil disc 6 of a coil module for an electrical machine, on the basis of which the cooling geometry is explained in more detail. The coil disc 5 comprises a coil carrier 15 made of an electrically insulating material and at least one winding 13 made of an electrically conductive material, which is arranged circumferentially around a center 14 of the at least one coil disc 6 on or in the coil disc 6.

Advantageously, the windings 13 are the windings described in more detail in the context of the present specification with active regions 16 and passive regions 17*a*, 17*b*, wherein the active regions 16 of different windings 13 do not overlap one another, but each passive region 17*a*, 17*b* of one of the windings 13 in each case partially overlaps the corresponding passive regions 17*a*, 17*b* of the two immediately adjacent windings 13, and in the active regions 16 the respective winding 13 have a greater thickness in cross-section in the axial direction than in the passive regions 17. However, the winding 13 may also be a different type of winding. For example, the at least one winding 13 can also be configured in the form of at least one winding arranged in a meandering manner around the center 14.

The coil disc 6 further comprises a substantially annular recess 22. The recess 22 is located on the inner side of the coil disc 6, i.e. the side facing the other coil disc in the coil module, such that the recess 22 is enclosed within the two coil discs to form the cooling channel. The recess 22 comprises an outer edge 24 and an inner edge 26, starting from which the recess 22 is recessed with respect to the remaining surface of the coil disc 6. That means, apart from the recess 22, the inner face of the coil disc 6 lies substantially in a plane, so that the edges 24 and 26 each represent the transition from the planar inner face of the coil disc 6 to the recess 22. Although the recess 22 is drawn in an exact annular shape in this embodiment, it need not be an exact annular shape according to the invention. The recess 22 extends substantially around the center 14 and is not located at the center 14 itself. However, the recess 22 may comprises a plurality web or webs discussed in more detail elsewhere in the present specification, which interrupts/interrupt the recess 22. Further, the inner edge 26 and/or outer edge 24 of the recess 22 need not be exactly annular and may have, for example, a polygonal or irregular shape.

The inner edge 26 of the recess 22 is located at the area of the transition from the active regions 16 to the inner passive regions 17*a* of the windings 13. The outer edge 24 of the recess 22 is located at the radially outermost area of the outer passive regions 17*b* of the windings 13. This arrangement of the recess 22 may be advantageous since the radially inner passive regions 17*a* are thicker than the radially outer passive regions 17*b* due to the limited space, and the inner passive regions 17*a* of immediately adjacent windings 13 each overlap in contrast to the active regions 16 so that the summed thickness in the axial direction of the radially inner passive regions 17*a* is greater than the thickness of the active regions 16. Therefore, space for the recess 22 is available in the region of the active regions 16 and optionally in the region of the outer passive regions 17*b*. Alternatively, the outer edge 24 of the recess 22 can also be located at the transition between active regions 16 and radially outer passive regions 17*b*.

It should be mentioned that if the electric machine is designed as optimally as possible, it may be advantageous to arrange the recess 22 as described. However, the recess 22 can also be arranged differently, e.g. if compromises are made for the space requirement, performance and/or degree efficiency.

The recess 22 may have different cross-sections, as exemplified in FIGS. 8A to 8D. FIGS. 8A to 8D each show a sectional view of the plane B-B shown in FIG. 7.

Although not explicitly shown, the coil disc 6 comprises a ceramic delimitation described in the context of the present patent specification which separates the coil carrier 15 from the coolant channel formed by the recess 22 so that the material of the coil carrier 15 does not absorb the coolant (particularly aqueous coolant).

FIG. 8A shows a recess 22 having a rectangular cross-section. The recess 22 has an outer lateral surface 30, a bottom surface 28, and an inner lateral surface 32, wherein the inner and outer lateral surfaces 30, 32 are each orthogonal to the bottom surface 28 and the bottom surface 28 is parallel to the inner side of the coil disc. Thus, the recess 22 has a constant depth 34 along the radial direction from the inside to the outside, i.e. from the inner edge 26 to the outer edge 24.

FIG. 8B shows a recess 22 with a trapezoidal cross-section. In contrast to the cross-section shown in FIG. 8A, the lateral walls 30 and 32 are not orthogonal to the bottom surface 28 but are inclined towards the bottom surface 28, so that the depth of the recess 22 increases steadily towards the bottom surface 28 in the region of the lateral walls 30, 32. In the region of the bottom surface 28, the height may again be constant as described with respect to FIG. 8A.

FIG. 8C shows a recess 22 with a depth 34*a*, 34*b* increasing in the radial direction from the inside to the outside, i.e. from the inner edge 26 to the outer edge 24. That means that the bottom surface 28 is at least partially not parallel to the inner side of the coil disc. For example, a portion of the bottom surface 28, such as a radially outer portion of the bottom surface 28, may be parallel to the inner side of the coil disc, whereas another portion of the bottom surface 28, such as a radially inner portion of the bottom surface 28, may be inclined such that the depth 34*a*, 34*b* of the recess 22 increases from radially inside to radially outside. Furthermore, the inner lateral surface 32 and the outer lateral surface 30 may each be orthogonal or angled to the inner side of the coil disc. In the present Example, the outer lateral surface 30 is orthogonal to the inner side of the coil disc, whereas the inner lateral surface 32 is angled thereto.

The recess 22 may be arranged in the coil disc in such a way that the part of the bottom surface 28 described above, which is parallel to the inner side of the coil disc, is located the area of the radially outer passive regions 17*b* of the windings, including their radially extending regions in which a cross-section change takes place. The inclined part of the bottom surface 28 is located in the region of the fanned-out active regions of the windings. The inner lateral surface 32 lies in the region of the inner passive regions of the windings, in which a cross-section change occurs.

This cross-section of the recess 22 shown in FIG. 8C may be given in particular when the active regions of the windings are "fanned out" as explained in the present patent specification. Said shape of recess is also called "V-Cooling" geometry.

FIG. 8D shows a cross-section of a recess 22 in which the transitions from the inner side of the coil disc to the inner lateral surface 32, to the bottom surface 28 and to the outer lateral surface 30 are steady and/or continuous. Such steady and/or continuous transitions are also possible for the cross-sections shown in FIGS. 8A to 8C.

The recesses shown in FIGS. 8A to 8D may comprise a ceramic delimitation disclosed as part of the present specification.

The recess 22 may also comprise a cross-sectional shape resulting from a combination of the cross-sections shown in FIGS. 8A to 8D.

FIGS. 9A and 9B show a plan view of a winding 13, by means of which the "fanning out" disclosed in the context of the patent specification is explained in more detail. The winding comprise two radially extending active regions 16 and an inner tangentially extending passive region 17*a* and an outer tangentially extending passive region 17*b*, each connecting the two active regions 16. As disclosed in the context of the present patent specification, the thickness in the axial direction of the winding 13 in the region of the active regions 16 is greater than the thickness in the axial direction of the passive regions 17*a*, 17*b*. Adjacent to the active regions 16, the passive regions 17*a*, 17*b* comprise short radial regions 35 and 36 in which cross-section changes of the respective winding 13 occur, each of which may also be accompanied by a plane change. Such transition regions can also be located in the active regions 16.

The active regions 16 have a fanned-out geometry. That means, in the radial direction from the inside to the outside, the width in the tangential direction of the winding 13 increases in the active regions 16, i.e. the width in the tangential direction of the winding 13 in the active regions 16 has a minimum value 38 at the radially innermost point, which is adjacent to the inner cross-section change 35, and a maximum value 40 at the radially outermost point, which is adjacent to the outer cross-section change 36. The width of the winding in the cross-section changes 35, 36 may be within and/or outside these values. The thickness in the axial direction of the winding in the active regions 16 decreases in the radial direction from the inside to the outside, i.e. takes a maximum value 42 at the radially innermost point, which is adjacent to the inner cross-section change 35, and a minimum value 44 at the radially outermost point, which is adjacent to the outer cross-section change 36. In the cross-section changes 35, 36, the thickness of the winding may be within and/or outside these values. The cross-section region of the winding 13 in the active regions 16 remains essentially constant along the radial direction.

This form of winding with the fanned-out active regions 16 can be advantageously combined with the recess shown in FIG. 8C, i.e. the "V-Cooling" geometry. This is shown, for example, in FIG. 10.

FIG. 10 shows a sectional view through a coil module 18. The coil module comprises first and second coil discs 6, each having windings 13 that have the fanned-out geometry shown in FIGS. 9A and 9B. The first and second coil discs 6 each have a substantially annular recess 22 extending from the inner cross-section changes 35 of the windings 13 to the outer passive regions 17*b* of the windings, respectively. Between the cross-section changes 35 and 36, the depth of the recesses 22 increases continuously from radially inward to radially outward, so that the recesses have the so-called "V-cooling" geometry.

Herein, both the first and second coil discs 6 each have a recess 22 that are precisely opposite each other when the coil module 18 is assembled, thereby confining and forming the cooling channel 23.

Figure 11A:
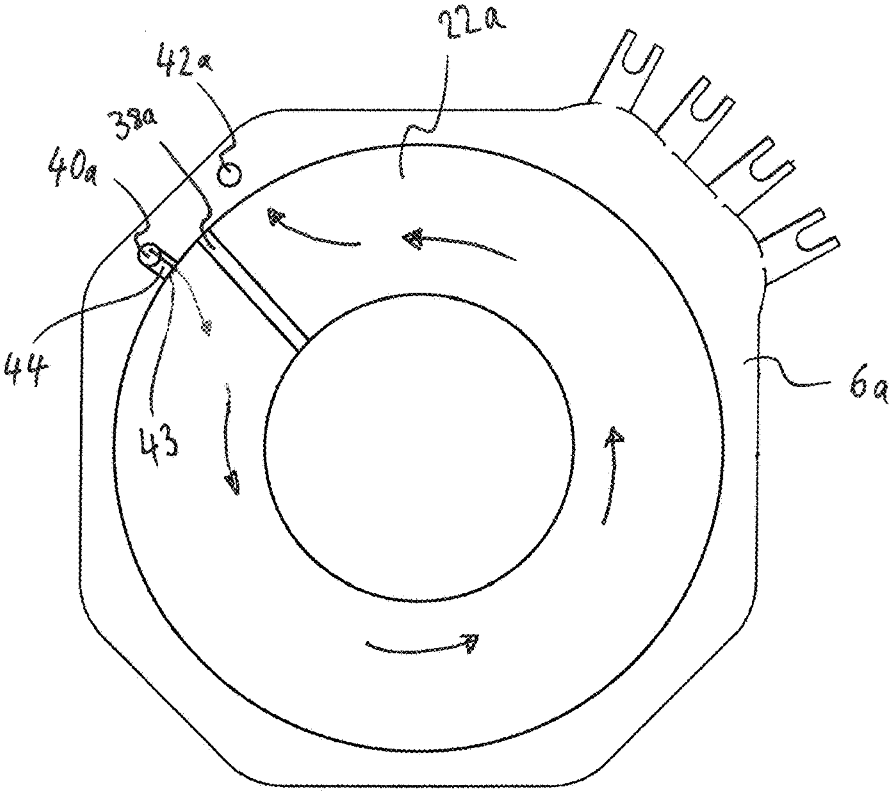
FIGS. 11A, 11B Plan views of first and second coil discs.
Figure 11B:
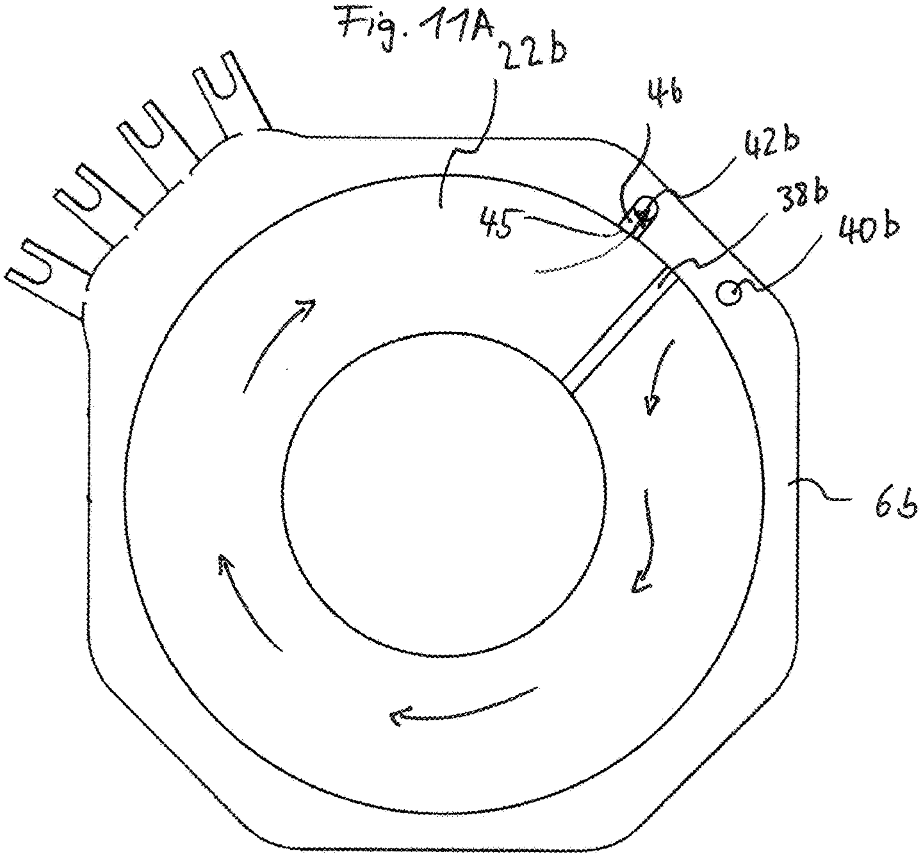

FIGS. 11A and 11B each show a plan view of the inner side of a first coil disc 6*a* and a second coil disc 6*b*, which are intended to be assembled into a coil module. For sake of conciseness, the windings are not shown in these Figures. The first coil disc 6*a* and the second coil disc 6*b* each comprises a substantially annular recess 22*a*, 22*b*. Furthermore, in the recess 22*a* a web 38*a* is formed and in the recess a web 38*b* is formed, the top of each of which located in the same plane as the rest of the inner side of the coil disc 6*a*, 6*b* (i.e. apart from the recess 22*a*, 22*b*).

The first coil disc 6*a* further comprises an inlet hole 40*a*, an inlet channel 44, and an outlet hole 42*a*. The inlet channel 44 forms an inlet opening 43 in the lateral surface of the recess 22*a*. The second coil disc 6*b* comprises an inlet hole 40*b*, an outlet hole 42*b*, and an outlet channel 46 that forms an outlet opening 45 in the lateral surface of the recess 22*b*.

In the assembled state of the coil module, this arrangement allows the coolant to flow through the inlet opening 40*a, b*, the inlet channel 44, the inlet opening 43 into the coolant channel formed by the recesses 22*a*, 22*b* and subsequently through the outlet opening 45 into the outlet port 46 and the outlet hole 42*a, b* as visualized by arrows.

The electrical machine typically comprises several such coil modules connected to each other via coil spacers. The coil spacers comprise corresponding inlet and outlet holes so that, when assembled, all inlet holes line up and all outlet holes line up. In the coil module or coil spacer located at an axial end of the electric machine, the inlet and outlet holes can be omitted in this case. Through the inlet and outlet holes in the coil module or spacer, which is located at the opposite axial end of the electrical machine, the coolant can be supplied and discharged.

Figure 12A:
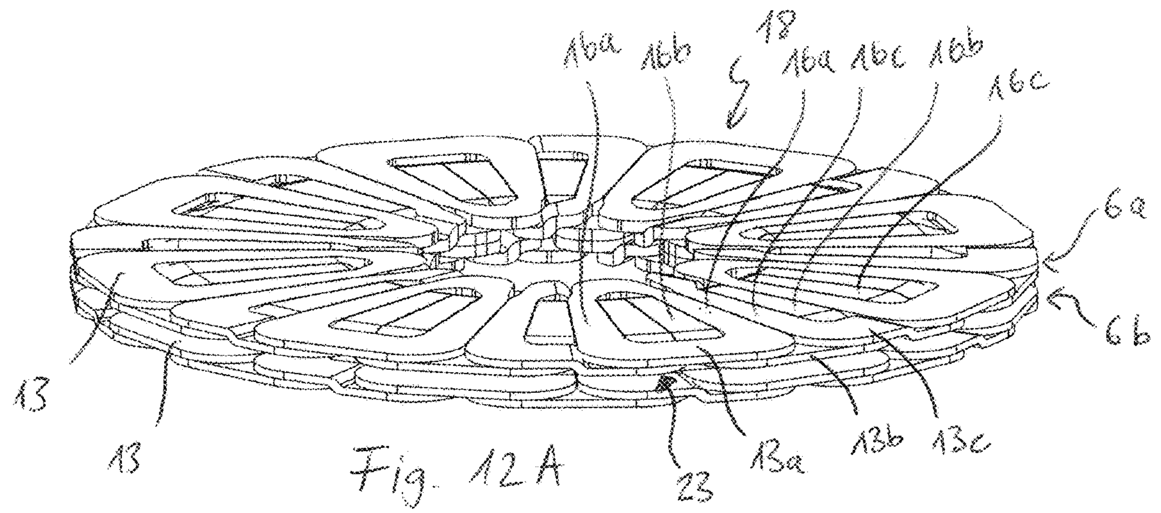
FIG. 12A A perspective view of a coil module.
Figure 12B:
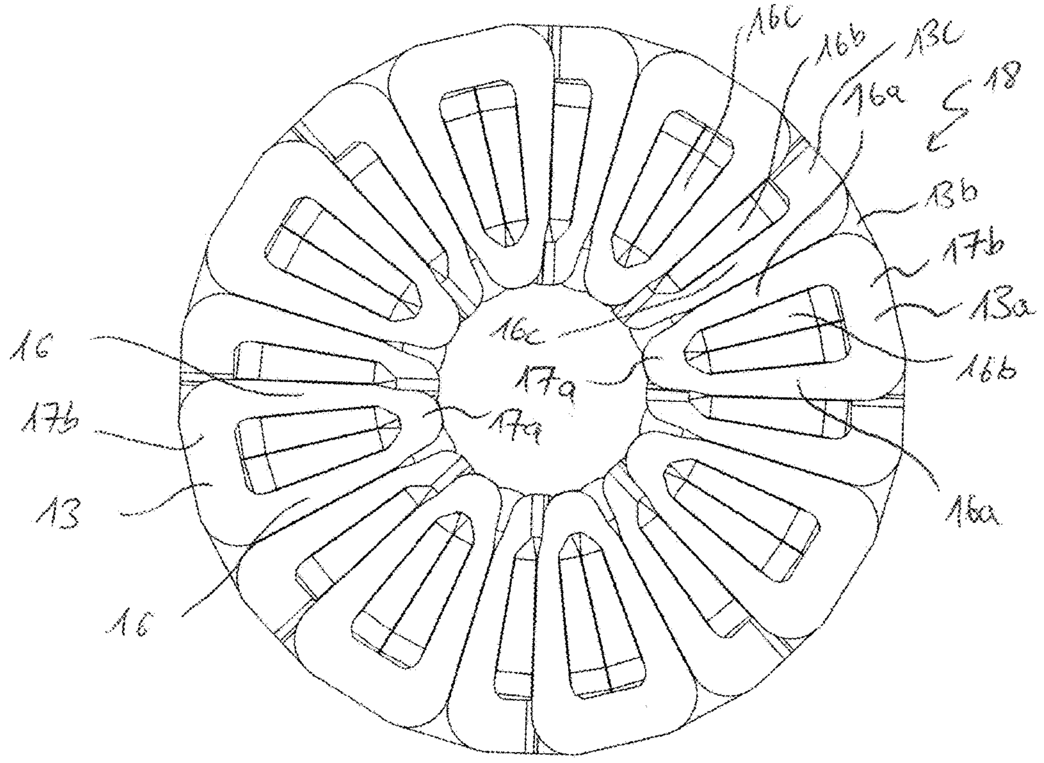
FIG. 12B A plan view of the coil module shown in FIG. 12A.
Figure 12C:
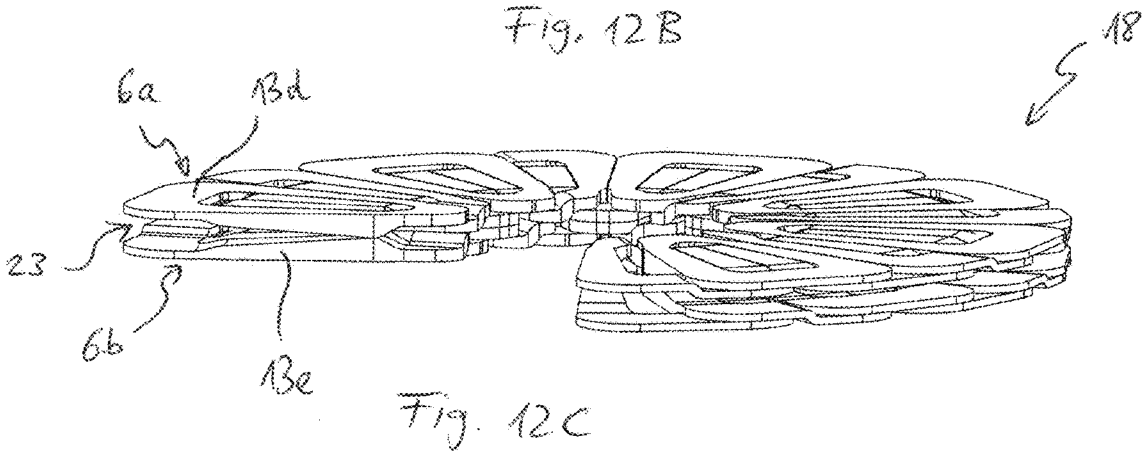
FIG. 12C A perspective view of a portion of the coil module shown in FIG. 12A.

FIGS. 12A, 12B and 12C illustrate a coil module used to explain the "fanning out" of active regions and "V-cooling" disclosed herein.

FIG. 12A shows a perspective view of the coil module 18. The coil module comprises a first coil disc 6*a* and a second coil disc 6*b*. The first coil disc 6*a* and the second coil disc 6*b* are attached to each other such that their respective inner sides face each other. The two recesses 22*a*, 22*b* provided on the inner side in each case thus face each other or lie on each other, so that they form a cooling channel 23 between the coil discs 6*a*, 6*b*.

The first coil disc 6*a* and the second coil disc 6*b* each comprise a plurality of windings 13. These windings 13 of a respective coil disc 6*a*, 6*b* may be designed differently. A first group of windings 13*a* are located in a first plane, such that both the active regions 16*a* and the passive regions are located in the first plane. A second group of windings 13*b* is arranged such that the tangential regions lie in a second plane which is offset from the first plane, and the active regions 16*b* are located in the first plane. The plane change occurs at the transitions to the active regions 16*b*. A third group of windings 13*c* is arranged such that the tangential regions are located in both the first plane and the second plane, so that a plane change occurs in the tangential regions. Additionally, a plane change occurs between the portion of the tangential region that are located in the second plane and the active region 16*c* that lies in the first plane. In this way, all active regions 16*a*, 16*b* and 16*c* of each of the coil discs 6*a*, 6*b* lie in a first plane.

FIG. 12B shows a plan view of the coil module 18. The windings comprise active regions 16 and passive regions 17*a*, 17*b* as disclosed herein. It is readily apparent that the active regions 16 of the windings 13 comprise the fanned-out shape described herein.

Furthermore, the windings 13*a*, 13*b* and 13*c* shown in FIG. 12A are shown. It is clearly visible that their adjacent active regions 16*a*, 16*b*, 16 are substantially adjacent to each other, so that there is preferably no gap.

FIG. 12C shows a perspective view of the coil module 18 with some of the windings omitted, so that the channel 23 between the first coil disc 6*a* and the second coil disc 6*b* is clearly visible. That means that between the windings 13*d* of the first coil disc 6*a* and the windings 13*e* of the second coil disc a space is formed which increases in axial height (or thickness in the axial direction) from radially inward to radially outward.

Figure 13A:
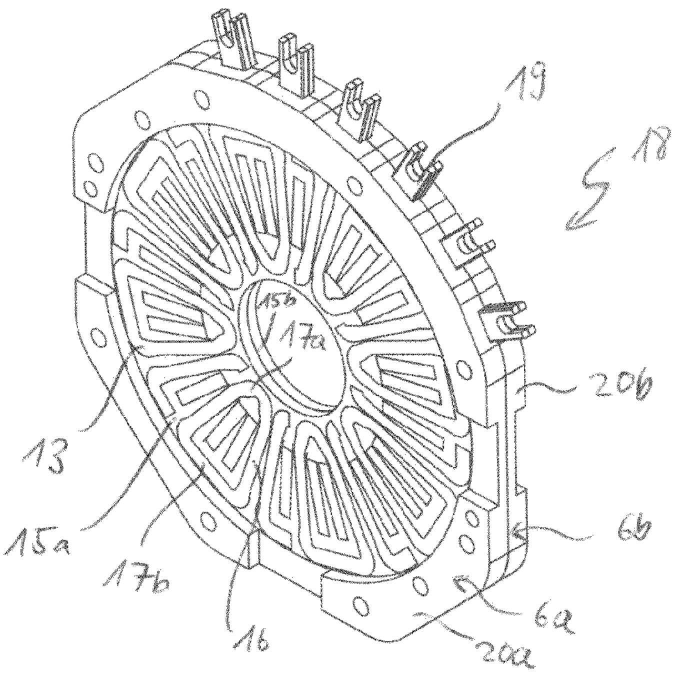
FIGS. 13A, 13B A perspective view and a plan view of a coil.

FIG. 13A shows a perspective view of a coil module 18 in an embodiment of the invention. The coil module comprises a first coil disc 6*a* and a second coil disc 6*b*. The first coil disc 6*a* comprises a first coil carrier 15*a* and a first coil carrier ring 20*a* that radially surrounds the first coil carrier 15*a* on the outside. Correspondingly, the second coil disc 6*b* comprises a second coil carrier 15*b* and a second coil carrier ring 20*b* radially surrounding the second coil carrier on the outside. The first and second coil carriers 15*a*, 15*b* each have windings 13 embedded therein, as disclosed in the context of this specification. The windings 13 comprise substantially radially extending active regions 16 and substantially tangentially extending inner passive regions 17*a* and outer passive regions 17*b*. The windings 13 are electrically connected to contacts 19.

Figure 13B:
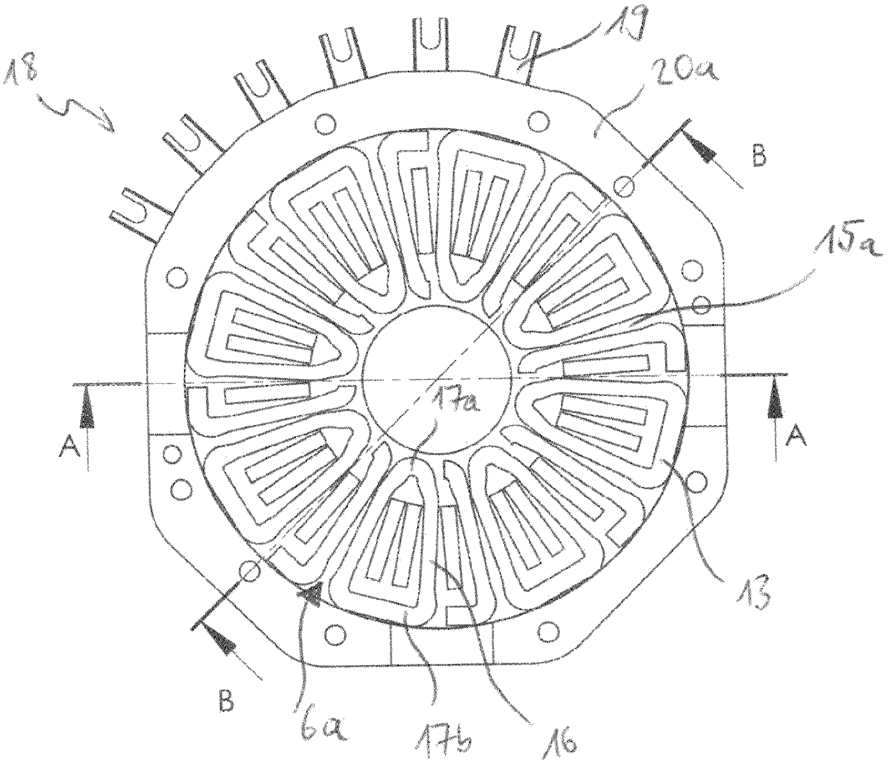

FIG. 13B shows a plan view of the coil carrier shown in FIG. 13A.

Figure 13C:
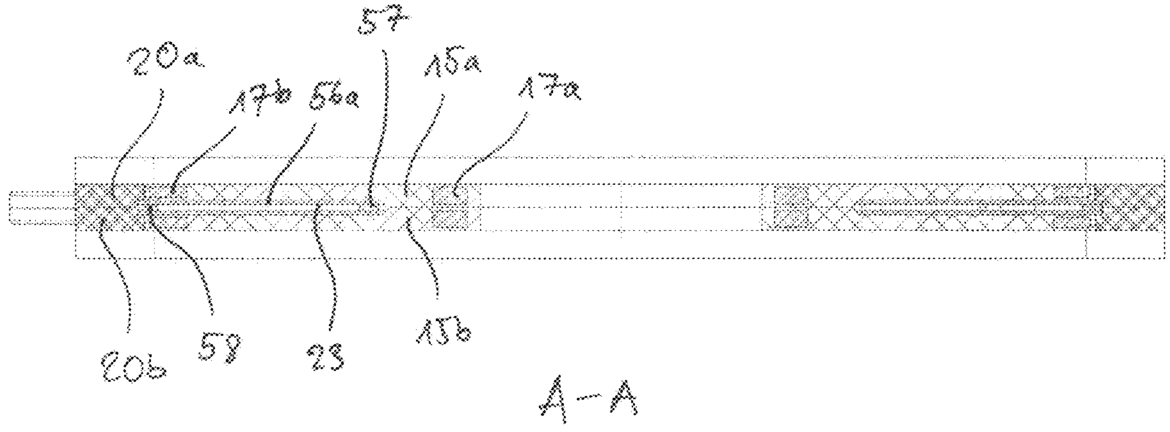
FIGS. 13C, 13D Sectional views along planes A-A and B-B in FIG. 13B.

FIG. 13C shows a cross-section along the sectional plane A-A shown in FIG. 13B. As shown in FIG. 13C, the first and second coil discs 6*a* and 6*b* are configured such that a substantially annular cooling channel 23 is formed between them. According to this embodiment, the cooling channel 23 extends in a radial area of the coil discs 6*a* and 6*b* and coil carriers 15*a* and 15*b* in which the active regions 16 and the outer passive regions 17*b* of the windings 13 are arranged.

The coil module 18 further comprises first and second ceramic delimitations 56*a* and 56*b*, a radially inner ceramic delimitation 57 and a radially outer ceramic delimitation 58 surrounding the cooling channel 23 and delimiting it from the first coil carrier 15*a* and second coil carrier 15*b*.

Figure 13D:
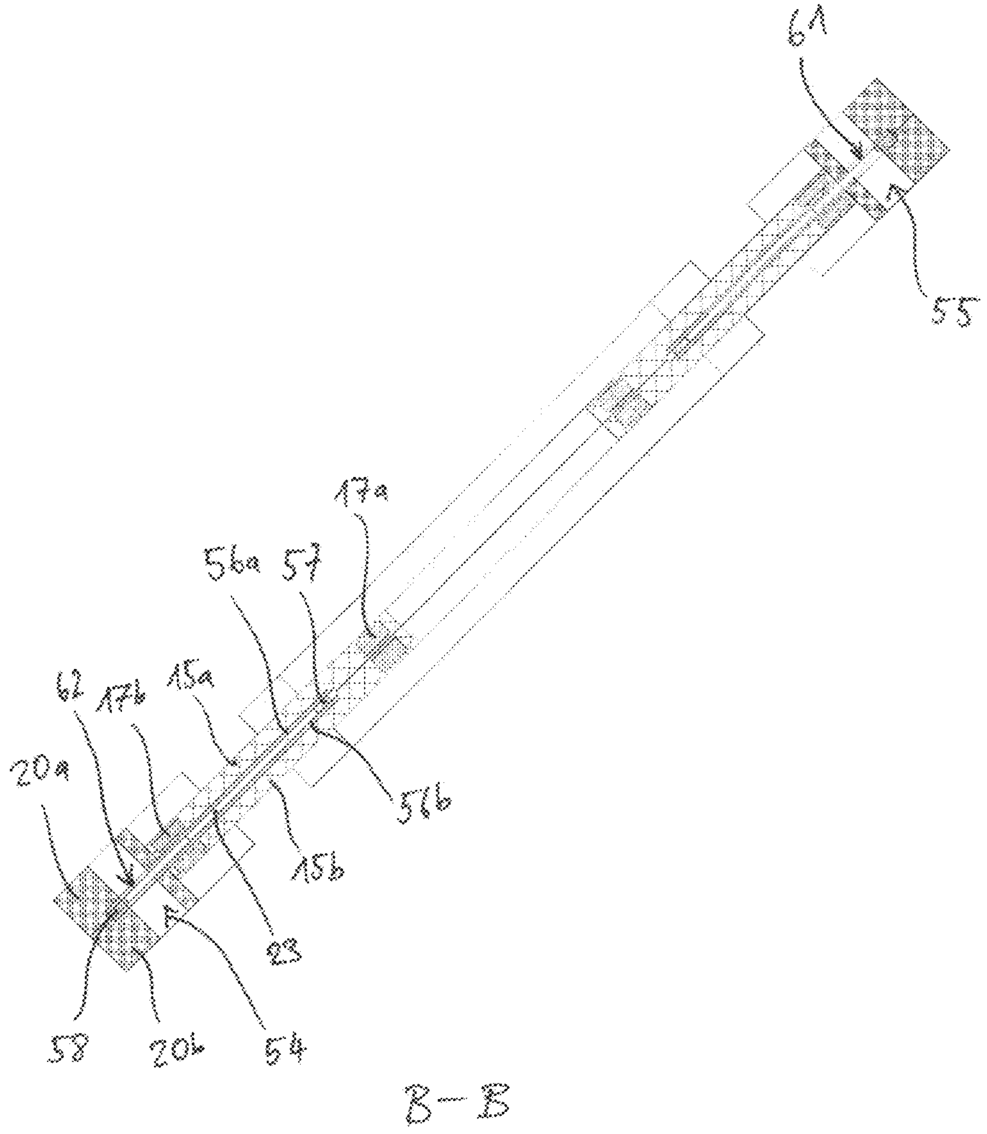

FIG. 13D shows a cross-section along the sectional plane B-B shown in FIG. 13B. FIG. 13D also shows the inlet opening 54 and the outlet opening 55. It is also shown that the first and second ceramic delimitations 56*a* and 56*b*, respectively, each comprise an opening 62 and 61 corresponding to inlet opening 54 and outlet opening 55, respectively. In this manner, coolant can enter and flow through the cooling channel 23 through the inlet opening 54 and exit through the outlet opening 55. Furthermore, the seals 56*a*, 56*b*, 57 and 58 ensure that the coolant does not come into contact with the material of the coil carriers 15*a* and 15*b*.

Figure 14A:
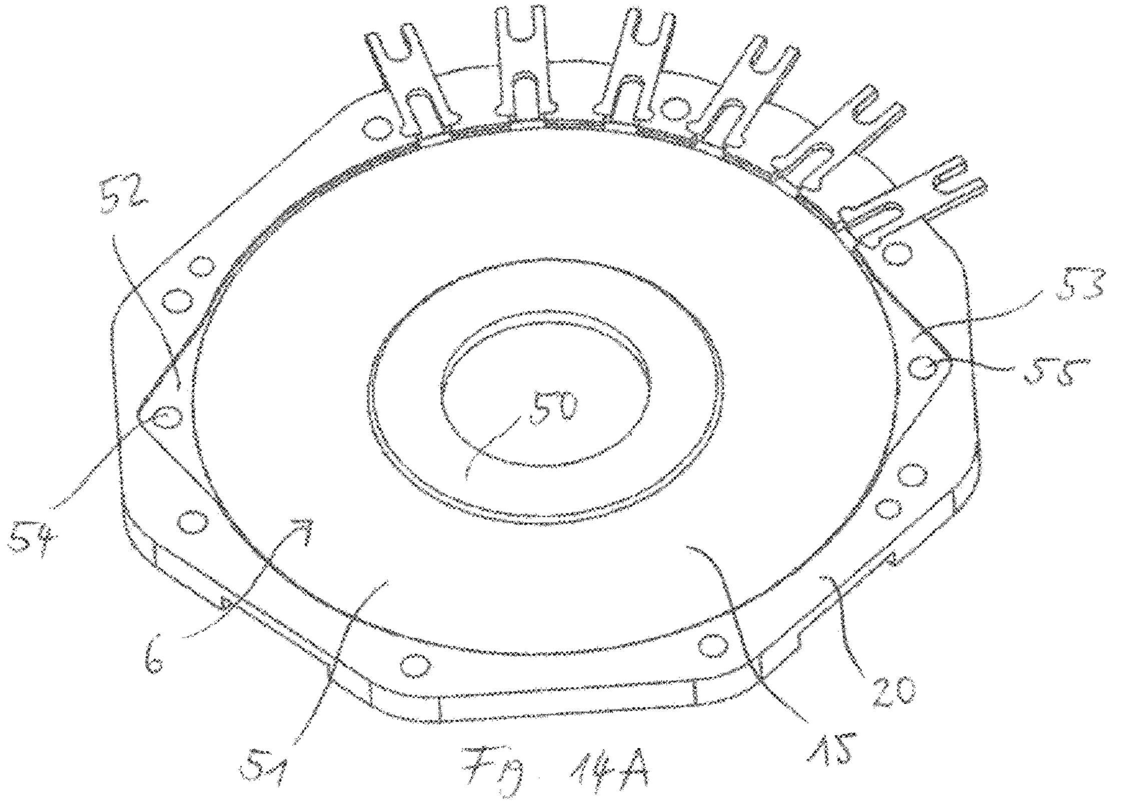
FIGS. 14A, 14B A coil disc without and with ceramic delimitation.

FIG. 14A shows a coil disc 6, such as is installed in the coil module 18 shown in FIGS. 13A-C, for example. The coil disc 6 comprises a coil carrier 15, which contains the windings disclosed in the context of the present specification, and a coil carrier ring 20.

The coil carrier 15 comprises a radially inner region 50 and a radially outer region 51, wherein the radially inner region 50 is raised relative to the radially outer region 51. In other words, the radially inner region 50 comprises a greater axial thickness than the radially outer region 51. In the radially inner region 50, the radially inner passive regions of the windings are arranged. In the radially outer region 51, the active regions and the radially outer regions of the windings are arranged. The coil carrier ring 20 is again raised relative to the radially outer region 51 of the coil carrier 15, so that it is substantially at the same level as the radially inner region 50 of the coil carrier 15. In the assembled state of the first coil disc and the second coil disc, the radially inner regions 50 of the first coil carrier 15 and the second coil carrier rest on one another.

In this way, when two coil discs 6 with mirrored structure are joined, a cooling channel is formed between the two coil discs and in a region between the coil carrier ring 20 and the radially inner region 50 of the coil carrier 15.

The coil carrier ring 20 further comprises an inlet opening 54 and an outlet opening 55. Around the inlet opening 54, the coil carrier ring 20 comprises a recessed region 52 that is substantially at the same level as and merges into the radially outer region 51 of the coil carrier 15. Around the outlet opening 55, the coil carrier ring 20 comprises a recessed region 53 that is substantially at the same level as and merges into the radially outer region 51 of the coil carrier 15.

In FIG. 14A, the coil disc 6 is shown without ceramic delimitation.

Figure 14B:
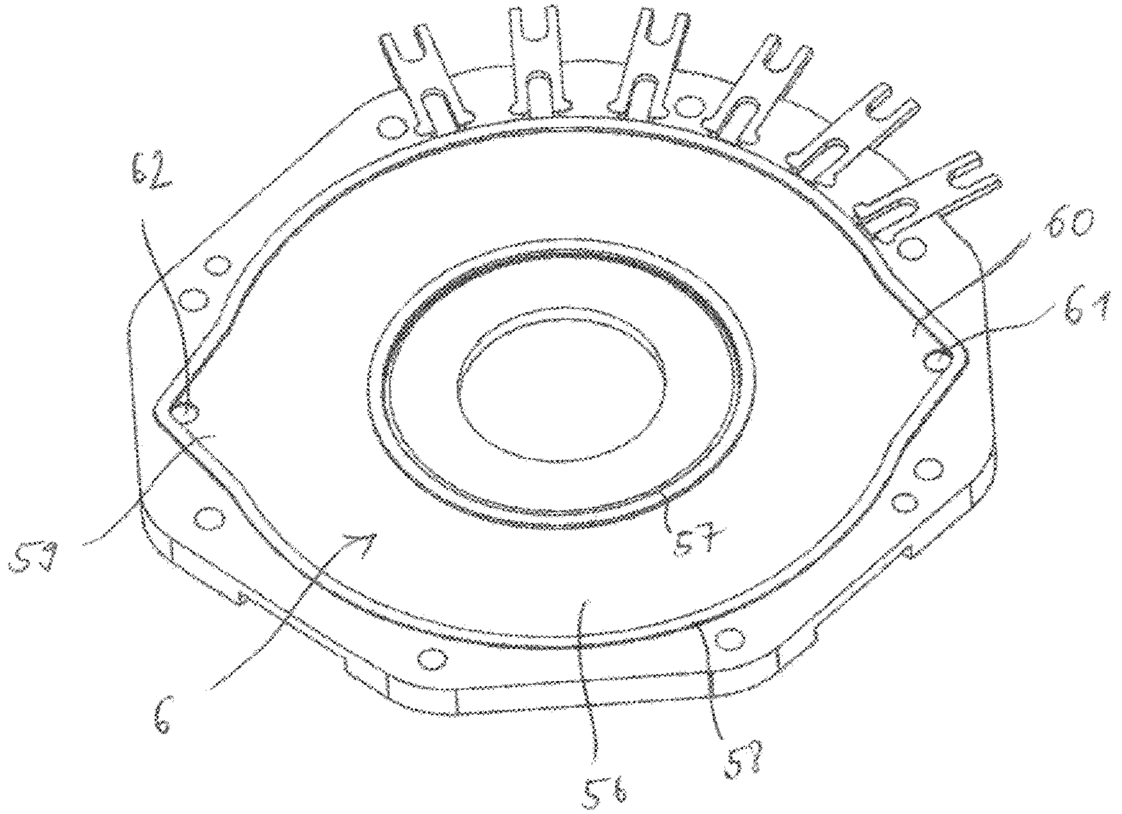

FIG. 14B shows the coil disc 6 shown in FIG. 14A with the ceramic delimitation 56. The ceramic delimitation 56 is substantially in the form of an annular disc arranged in the radially outer region 51 and in the recessed regions 52 and 53 of the coil carrier ring. In other words, the substantially annular ceramic disc 56 has two projections 59 and 60 corresponding to the recessed regions 52 and 53 of the coil carrier ring 20.

FIG. 14B further shows that the coil disc 6 comprises a radially inner delimitation 57 surrounding the radially inner edge of the annular ceramic disc 56. The coil disc 6 further comprises a radially outer delimitation 58 surrounding the radially outer edge of the annular ceramic disc 56.

The annular ceramic disk 56 further comprises two openings 61 and 62 corresponding to the inlet opening 54 and outlet opening 55.

In this way, the cooling channel is completely delimited from the surrounding material of the coil carrier 15 and the coil carrier ring 20.

For example, the coil disc 6 is a first coil disc and the ceramic delimitation 56 is a first coil disc. The coil module disclosed as part of the present specification further comprises a second coil disc substantially corresponding to a coil disc mirrored to the coil disc 6, and a second ceramic delimitation.

Figure 15A:
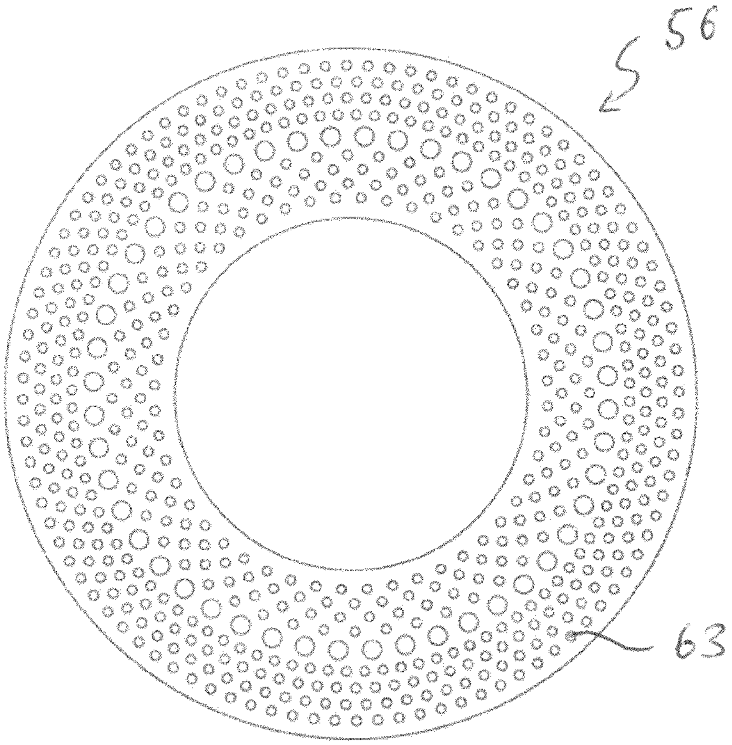
FIGS. 15A, 15B a ceramic delimitation with connecting elements, respectively.

FIG. 15A shows a first or second ceramic delimitation 56. The ceramic delimitation 56 comprises a plurality of connecting elements 53 oriented in the perpendicular direction to the ceramic delimitation 56. In the coil module having two ceramic delimitations 56, the connecting elements 53 connect the first and second ceramic delimitations.

Figure 15B:
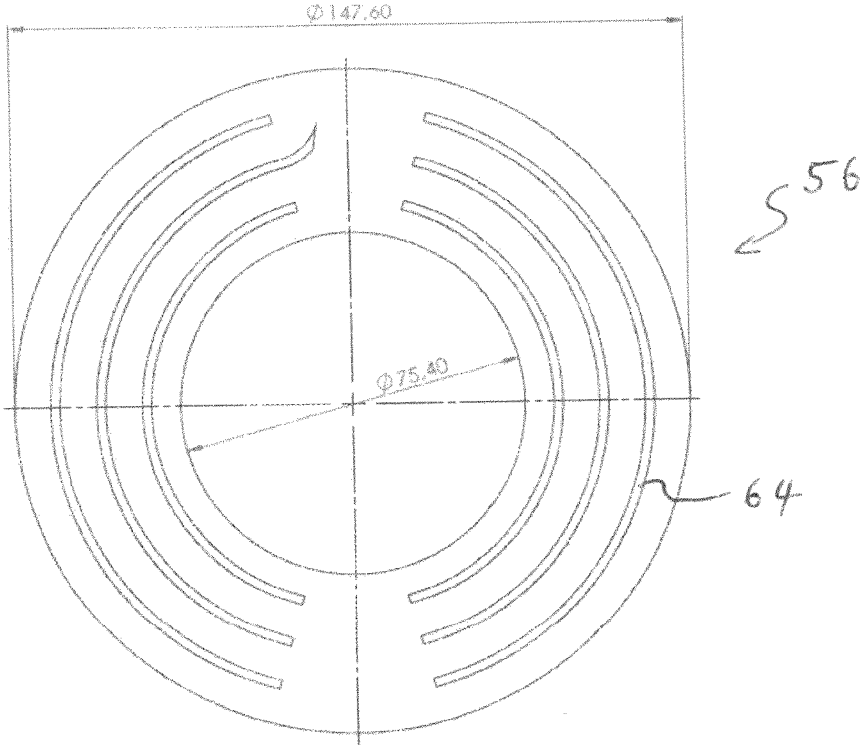

FIG. 15B shows a first or second ceramic delimitation 56 with connecting elements 64 configured in the form of guiding structures or guiding ribs. These connecting elements 64 connect the first and second ceramic delimitations in the coil module with two ceramic delimitations 56.

Figure 16:
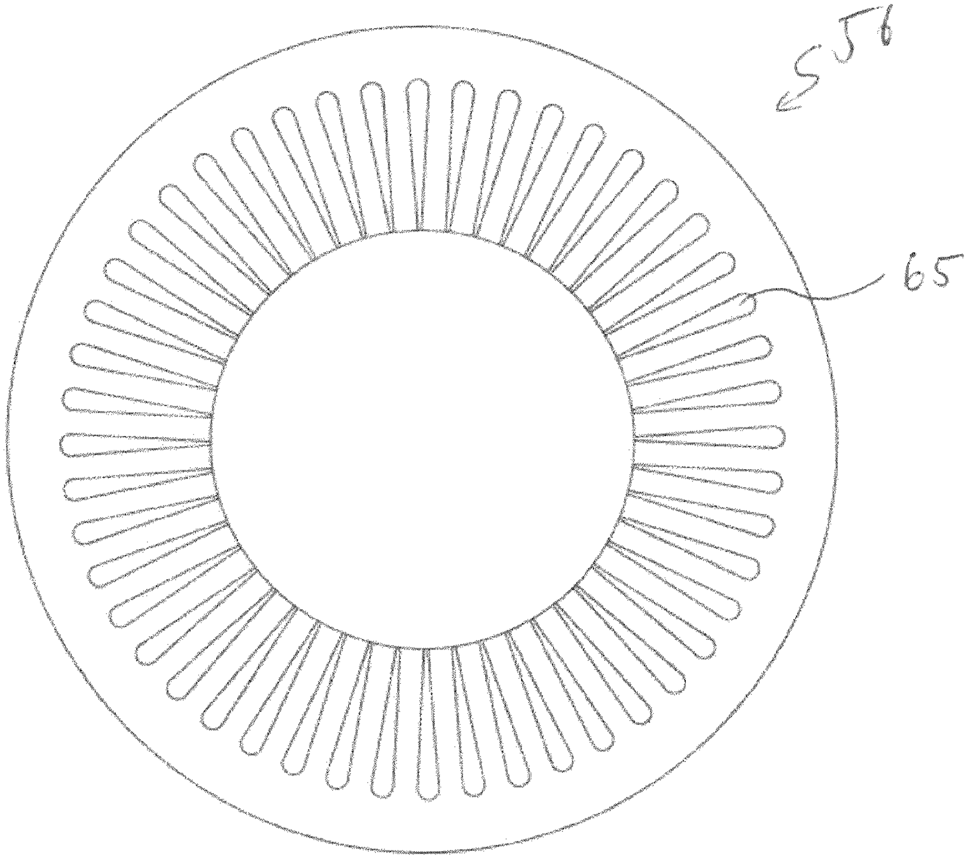
FIG. 16A ceramic delimitation with projections.

FIG. 16 shows a ceramic delimitation 56. The ceramic delimitation 56 has a plurality of projections 65 that are in the form of "pie pieces" or sectors of a circle. The projections 65 are configured to project into corresponding gaps formed in the coil carrier between two adjacent active regions of the windings.

Figure 17:
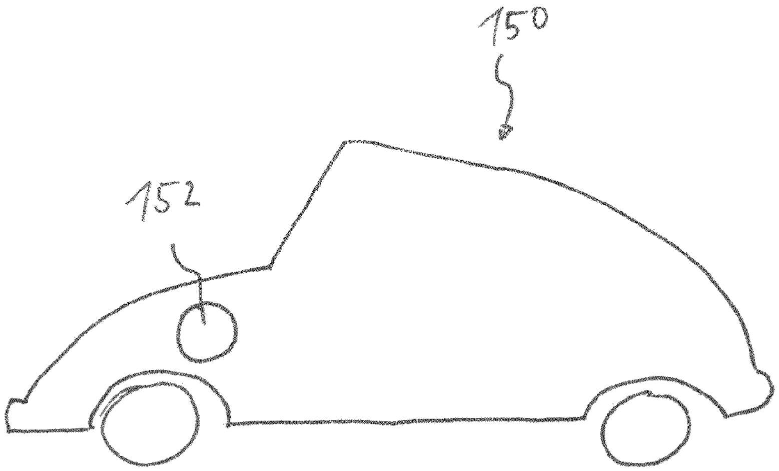
FIG. 17A vehicle.

FIG. 17 shows a vehicle 150 having an electric machine 152 disclosed in the present specification.

Figure 18:
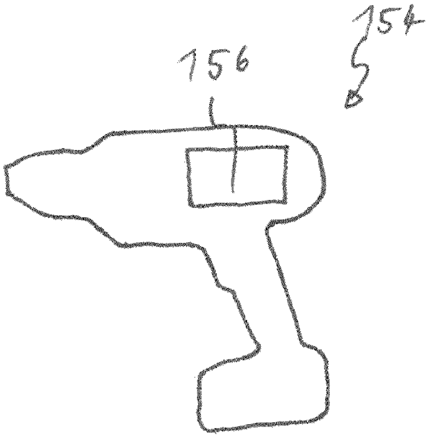
FIG. 18A machine tool.

FIG. 18 shows a machine tool 154 having an electric machine 156 disclosed in the context of the present specification.

Features of the various embodiments disclosed only in the Examples may be combined and claimed individually.

The invention claimed is:

1. A coil module for an electric machine, comprising:

a first coil disc with a first coil carrier made of an electrically insulating material, at least one winding embedded in the first coil carrier and made of an electrically conductive material, and a first ceramic delimitation;

a second coil disc with a second coil carrier made of an electrically insulating material, at least one winding embedded in the second coil carrier and made of an electrically conductive material, and a second ceramic delimitation;

wherein the first coil disc and the second coil disc are configured and attached to each other such that a substantially annular cooling channel for a coolant is formed between the first coil disc and the second coil disc; and wherein the first ceramic delimitation and the second ceramic delimitation each form at least partially an inner wall of the substantially annular cooling channel;

wherein the first coil carrier and/or the second coil carrier comprise/comprises a substantially annular recess; and wherein the first ceramic delimitation and/or the second ceramic delimitation are/is provided in form of a substantially annular ceramic disc which is arranged in the substantially annular recess on the first coil carrier and/or the second coil carrier.

2. The coil module according to claim 1, wherein the first and/or second ceramic delimitation comprise/comprises an aluminum-based and/or silicon-based ceramic.

3. The coil module according to claim 1, wherein the first ceramic delimitation forms the inner wall of the substantially annular cooling channel in the entire radial region of the substantially annular cooling channel; and/or wherein the second ceramic delimitation forms the inner wall of the substantially annular cooling channel in the entire radial region of the substantially annular cooling channel.

4. The coil module according to claim 1, wherein the first ceramic delimitation comprises a first ceramic disc arranged on the first coil carrier and/or the second ceramic delimitation comprises a second ceramic disc arranged on the second coil carrier; wherein the first ceramic disc and/or the second ceramic disc have/has a thickness between 0.1 mm and 1 mm.

5. The coil module according to claim 1, wherein the first ceramic delimitation comprises a ceramic coating applied to the first coil carrier and/or the second ceramic delimitation comprises a second ceramic coating applied to the second coil carrier;

wherein the first ceramic coating and/or the second ceramic coating have/has a thickness between 1 μm and 100 μm.

6. The coil module according to claim 1, further comprising:

at least one connecting element which is arranged in the substantially annular cooling channel and connected to both the first ceramic delimitation and the second ceramic delimitation;

wherein the at least one connecting element comprises an aluminum-based and/or silicon-based ceramic; and/or wherein the at least one connecting element is adhered to or integrally formed with the first ceramic delimitation and/or the second ceramic delimitation; and/or comprises a strut; and/or comprises a rib extending in parallel to the first and/or second coil disc.

7. The coil module according to claim 1, further comprising a radially inner ceramic delimitation and a radially outer ceramic delimitation;

wherein the radially inner ceramic delimitation viewed in the radial direction, is arranged inside adjacent to the first ceramic delimitation and the second ceramic delimitation; and wherein the radially outer ceramic delimitation viewed in the radial direction, is arranged outside adjacent to the first ceramic delimitation and the second ceramic delimitation.

8. The coil module according to claim 1, wherein the first coil disc and/or the second coil disc comprises an inlet opening for conducting coolant into the substantially annular cooling channel; and/or wherein the first coil disc and/or the second coil disc comprises an outlet opening for conducting coolant from the substantially annular cooling channel to the outside.

9. An electric machine comprising a bearing arrangement and a shaft guided in the bearing arrangement, wherein at least one magnet module comprising a plurality of permanent magnets and at least one coil module according to claim 1 are concentrically arranged along the shaft.

10. A vehicle or machine tool comprising an electric machine according to claim 9.

11. The coil module according to claim 1, wherein a plurality of individual windings made of an electrically conductive material are embedded in the first coil carrier, each of which is embedded in the first coil carrier circumferentially around a center of the first coil carrier, wherein a plurality of individual windings made of an electrically conductive material are embedded in the second coil carrier, each of which is embedded in the second coil carrier circumferentially around a center of the second coil carrier, wherein each of the windings comprises two active regions extending radially from the center and two passive regions extending tangentially at radially outer and inner edges of the respective winding, and wherein, in a plan view of the coil disc, the active regions of different windings do not cover each other, but each passive region of one of the windings partially covers the corresponding passive regions of the two directly adjacent windings, wherein, in the axial direction the respective winding, in cross-section, has a greater thickness in the active regions than in the passive regions.

12. The coil module according to claim 11, wherein adjacent active regions of the plurality of individual windings of the first coil disc and the second coil disc are spaced apart from each other in the tangential direction so that a gap is arranged between the adjacent active regions, and wherein each of the first ceramic delimitation and the second ceramic delimitation comprises projections which extend into the gaps arranged between the adjacent active regions.

13. The coil module according to claim 11, wherein the cooling channel is arranged at least in the region of the radially extending active regions.

14. The coil module according to claim 11, wherein the windings are formed of a fine strand of a plurality of wires electrically insulated from each other and having a wire diameter of less than or equal to 0.1 mm.

* * * * *